US012468992B2

(12) United States Patent
Pande et al.

(10) Patent No.: US 12,468,992 B2
(45) Date of Patent: Nov. 11, 2025

(54) ITEM SUBSTITUTION TECHNIQUES FOR ASSORTMENT OPTIMIZATION AND PRODUCT FULFILLMENT

(71) Applicant: Target Brands, Inc., Minneapolis, MN (US)

(72) Inventors: Amit Pande, Ames, IA (US); Aparupa Das Gupta, Minneapolis, MN (US); Kai Ni, Chanhassen, MN (US); Rahul Biswas, Minneapolis, MN (US); Sayon Majumdar, Sunnyvale, CA (US)

(73) Assignee: TARGET BRANDS, INC., Minneapolis, MN (US)

( * ) Notice: Subject to any disclaimer, the term of this patent is extended or adjusted under 35 U.S.C. 154(b) by 913 days.

(21) Appl. No.: 17/174,667

(22) Filed: Feb. 12, 2021

(65) Prior Publication Data
US 2021/0166179 A1  Jun. 3, 2021

Related U.S. Application Data

(63) Continuation-in-part of application No. 16/778,158, filed on Jan. 31, 2020, now Pat. No. 11,373,233.
(Continued)

(51) Int. Cl.
*G06Q 30/06* (2023.01)
*G06N 3/04* (2023.01)
(Continued)

(52) U.S. Cl.
CPC ........ *G06Q 10/06315* (2013.01); *G06N 3/04* (2013.01); *G06N 3/08* (2013.01); *G06Q 30/0202* (2013.01)

(58) Field of Classification Search
CPC ........... G06Q 30/0631; G06Q 30/0202; G06Q 10/06315; G06N 3/08; G06N 3/04
(Continued)

(56) References Cited

U.S. PATENT DOCUMENTS 5,461,699 A  10/1995  Arbabi et al.
5,696,907 A  12/1997  Tom
(Continued)

FOREIGN PATENT DOCUMENTS

CN           108052966 A       5/2018
DE     10 2016 220 723 A1     4/2018
(Continued)

OTHER PUBLICATIONS

Miller, Christopher et al. "Optimizing and Evaluating Retail Assortments for Infrequently Purchased Products"; Journal of Retailing, suppl. Sp Modeling Retail Phenomena 86.2: 159-171. Greenwich Elsevier Limited. (Jun. 2010) retrieved from Dialog Dec. 27, 2023 (Year: 2010).*

(Continued)

*Primary Examiner* — Yogesh C Garg
(74) *Attorney, Agent, or Firm* — MERCHANT & GOULD P.C.

(57) ABSTRACT

Methods and systems for optimizing a product assortment, and managing product fulfillment, are disclosed. One method includes utilizing a model trained on item data to identify item substitution pairs within an item category of an item assortment, the item substitution pairs being identified as having a substitutability score above a predetermined threshold. The method further includes applying an assortment optimization model to generate an assortment recommendation for the item category at an identified retail location. A request for an item not included in the assortment recommendation may result in suggestion of an identified substitutable item from among the item substitution pairs.

13 Claims, 16 Drawing Sheets

Related U.S. Application Data

(60) Provisional application No. 62/975,592, filed on Feb. 12, 2020, provisional application No. 62/800,399, filed on Feb. 1, 2019.

(51) Int. Cl.
*G06N 3/08* (2023.01)
*G06Q 10/0631* (2023.01)
*G06Q 30/0202* (2023.01)

(58) Field of Classification Search
USPC ........................................ 705/26.7
See application file for complete search history.

(56) References Cited

U.S. PATENT DOCUMENTS

| | | | |
|---|---|---|---|
| 6,035,284 A | 3/2000 | Straub et al. | |
| 6,366,890 B1 | 4/2002 | Usrey | |
| 7,058,587 B1 | 6/2006 | Horne | |
| 7,640,169 B2 | 12/2009 | Horton | |
| 8,417,559 B2 | 4/2013 | Joshi et al. | |
| 8,688,598 B1 | 4/2014 | Shakes et al. | |
| 10,109,004 B1 * | 10/2018 | Hawley | G06Q 10/06375 |
| 10,134,004 B1 | 11/2018 | Liberato, Jr. et al. | |
| 11,562,039 B2 * | 1/2023 | Renders | G06F 16/75 |
| 2002/0120435 A1 | 8/2002 | Frazier et al. | |
| 2003/0171978 A1 | 9/2003 | Jenkins et al. | |
| 2004/0267676 A1 | 12/2004 | Feng et al. | |
| 2005/0114196 A1 | 5/2005 | Schoenmeyr | |
| 2006/0112028 A1 | 5/2006 | Xiao et al. | |
| 2008/0208719 A1 | 8/2008 | Sharma et al. | |
| 2009/0271245 A1 | 10/2009 | Joshi et al. | |
| 2010/0306031 A1 | 12/2010 | McCauley et al. | |
| 2011/0276364 A1 * | 11/2011 | Bergstrom | G06Q 10/04 705/7.29 |
| 2014/0025420 A1 | 1/2014 | Joshi et al. | |
| 2014/0058781 A1 | 2/2014 | Padmanabhan et al. | |
| 2014/0129371 A1 | 5/2014 | Wilson et al. | |
| 2015/0112762 A1 | 4/2015 | Lahmar et al. | |
| 2015/0149484 A1 | 5/2015 | Kelley | |
| 2016/0154939 A1 | 6/2016 | Grabiner et al. | |
| 2016/0210640 A1 | 7/2016 | Wu et al. | |
| 2017/0323367 A1 | 11/2017 | Crow | |
| 2018/0247224 A1 | 8/2018 | Garcia Duran et al. | |
| 2018/0315059 A1 * | 11/2018 | Venkatesh | G06Q 10/087 |
| 2019/0042995 A1 | 2/2019 | Nemati et al. | |
| 2019/0121867 A1 * | 4/2019 | Misra | G06F 16/24578 |
| 2019/0140988 A1 | 5/2019 | Snider et al. | |
| 2019/0180301 A1 * | 6/2019 | Mahalanobish | H04W 4/35 |
| 2019/0251480 A1 * | 8/2019 | Garcia Duran | G06N 20/20 |
| 2019/0286658 A1 | 9/2019 | Leskovec et al. | |
| 2020/0005209 A1 | 1/2020 | Rangarajan et al. | |
| 2020/0219008 A1 | 7/2020 | Franceschi et al. | |
| 2020/0250734 A1 | 8/2020 | Pande et al. | |
| 2022/0335501 A1 | 10/2022 | Pande et al. | |

FOREIGN PATENT DOCUMENTS

| | | | |
|---|---|---|---|
| JP | 2019-527865 A | 10/2019 | |
| WO | WO-03054756 A2 * | 7/2003 | G06K 13/0825 |
| WO | 2017019534 A1 | 2/2017 | |
| WO | 2017083399 A2 | 5/2017 | |

OTHER PUBLICATIONS

Thesis, "Online, Data Driven Learning Approaches in Operations Management Problems"; Ramamurthy, Vivek. ProQuest Dissertations and Theses ProQuest Dissertations Publishing. (2012) retrieved from Dialog on Apr. 20, 2024 (Year: 2012).*
Shin et al. "A Classification of the Literature on the Planning of Substitutable Products." European Journal of Operational Research, vol. 246, Issue 3, Nov. 1, 2015, pp. 686-699.
William L. Hamilton et al. (Department of Computer Science, Stanford University), "Inductive Representation Learning on Large Graphs", 31st Conference on Neural Information Processing Systems (NIPS), 2017, 11 Pages.
Rex Ying et al.(Stanford University), "Graph Convolutional Neural Networks for Web-Scale Recommender Systems", Association for Computing Machinery, 2018, 10 Pages.
Logivations (Consulting & Technology)—AI-Based Identification Solutions in Logistics, Logivations GmbH, 2020, 8 Pages.
Noceti, et al., A multi-camera system for damage and tampering detection in a postal security framework, EURASIP Journal on Image and Video Processing 'Research—Open Access', Nov. 2018; 13 Pages.
Wue, Le; Sun, Peijie; Hong, Richang; Fu, Yanjie; Wang, Xiting; et al. "Social GCN: An Efficient Graph Convolutional Network based Model for Social Recommendation,"arXiv.orglthaca: Cornell University Library, arXiv.org (Jul. 11, 2019), First available Nov. 9, 2018 (Year: 2018) retrieved from Dialog on Jun. 13, 2024.
Mikolov, Tomas, et al. "Distributed representations of words and phrases and their compositionality. In Advances in neural information processing systems," pp. 3111-3119, 2013.
Simonyan, Karen and Andrew Zisserman, Very deep convolutional networks for large-scale image recognition arXiv preprint arXiv: 1409.1556, 2014.
Pande et al., "Substitution Techniques for Grocery Fulfillment and Assortment Optimization Using Product Graphs," MLG '20, Aug. 22-27, 2020, San Diego, CA.
Jason Brownlee "Loss and Loss Functions for Training Deep Learning Neural Networks" Jan. 28, 2019, Machine Learning Mastery (Year: 2019).

* cited by examiner

Pirouette Crème Filled Wafers Chocolate Fudge Cookies

Pirouette Crème Filled Wafers Chocolate Hazelnut Cookies

Chocolate Hazelnut Crème-Filled Rolled Wafers

Valentines Day Sugar Cookies

Valentine Conversation Hearts Sugar Cookie

Be Mine Sugar Cookie

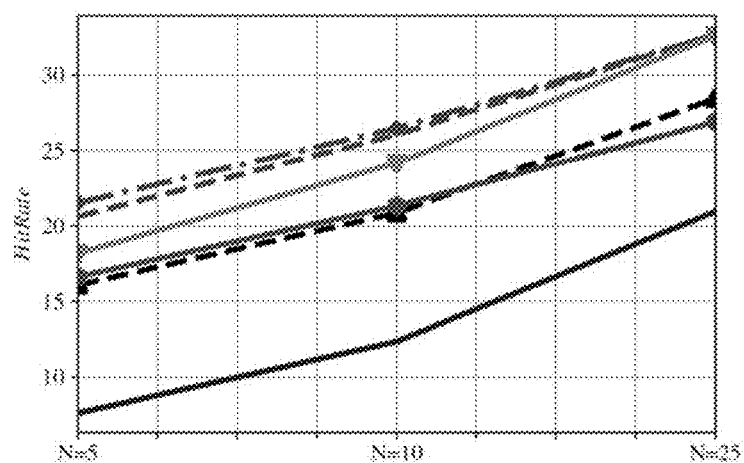
(a) Sessions dataset
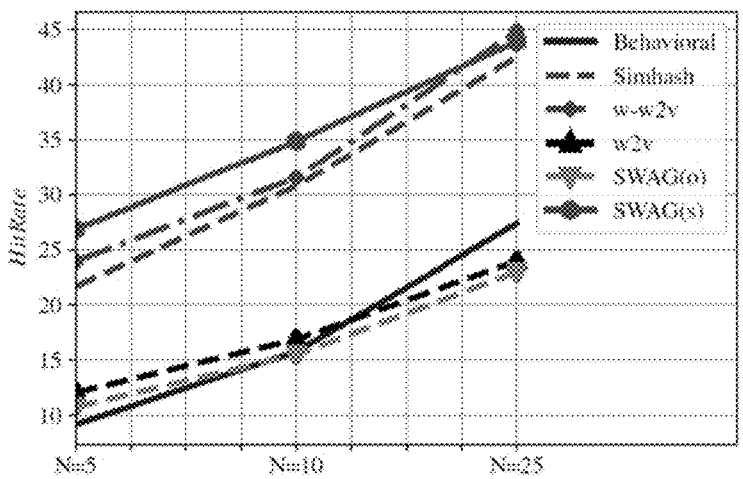
(b) OOS dataset
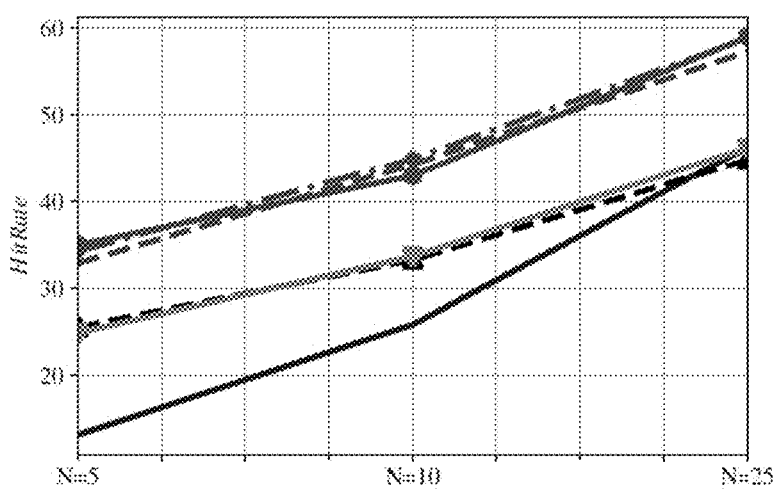
(c) Offline dataset
FIG. 10A
FIG. 10B
FIG. 10C (a) Sessions dataset (b) OOS dataset (c) Offline dataset

| Top Sellers Selected | Fair Sellers Dropped | Low Sellers Selected |
|---|---|---|
| #1, #2, #3 ... #162, #164, #165, #166, #167, #168, #170, #171, #172, #173, #175, #177, #178, #181, #182, #184, #185 | #163, #169, #174, #176, #179, #180, #183, #186 | #187, #188, #189, #190, #191, #194, #195, #204 |

| Metric | Market | Increment | Bounds | Significance |
|---|---|---|---|---|
| units | Atlanta | >9% | (-3, 22) | FLAT |
| trans | Atlanta | >9% | (-1, 24) | FLAT |
| units | Chicago | >12% | (2, 25) | YES |
| trans | Chicago | >12% | (2, 25) | YES |
| units | Houston | >15% | (5, 28) | YES |
| trans | Houston | >15% | (5, 27) | YES |
| units | Washington D.C | >4% | (-2, 15) | FLAT |
| trans | Washington D.C | >4% | (-2, 15) | FLAT |

ITEM SUBSTITUTION TECHNIQUES FOR ASSORTMENT OPTIMIZATION AND PRODUCT FULFILLMENT

CROSS-REFERENCE TO RELATED APPLICATIONS

The present application claims priority from U.S. Provisional Patent Application No. 62/975,592, filed on Feb. 12, 2020, the disclosure of which is hereby incorporated by reference in its entirety.

The present application also claims priority as a continuation-in-part application from U.S. patent application Ser. No. 16/778,158, filed on Jan. 31, 2020, which claims priority from U.S. Provisional Patent Application No. 62/800,399, filed Feb. 1, 2019, the disclosures of which are both incorporated by reference in their entireties.

BACKGROUND

In a retail context, physical stores have limited shelf space and a retailer has to intelligently select its assortment to satisfy the local demands. Even in an online context, an item assortment that is offered must typically be finite due to the complexity in managing large item assortments. Determining the best product mix and inventory size are of strategic importance to a retailer looking to optimize store and online fulfillment.

Assortment planning is the process to determine what and how much of each product should be carried in a merchandise category. It is a trade-off between the shelf space and the items to show to customers. Substitutability is a key factor in deciding the right cohort of items within a category. Assortment planning refers to the problem of selecting the right set of products to offer to a group of customers to maximize the revenue that is realized when customers make purchases according to their preferences.

It can be difficult, absent experimental results, to determine an appropriate item assortment to maximize revenue at a particular store, or even within an online assortment. Accordingly, improvements in techniques for accurately developing appropriate item assortments in varying contexts are desirable.

SUMMARY

In summary, the present application is directed to use of item substitution techniques for assortment optimization and product fulfillment by a retail organization. By using particular modeled item substitution analyses, an optimized assortment may be generated by substituting items where constraints otherwise would not allow all items to be stocked due to, e.g., physical space constraints. Additionally, where a particular item is sought at a retail location, the same item substitution analyses may be used to determine an appropriate suggested alternative item within the assortment of items stocked at the retail location.

In a first aspect, a method of determining an item assortment includes utilizing a model trained on item data and item selection data to identify one or more item substitution pairs within an item category of an item assortment, the item substitution pairs being identified as having a substitutability score above a predetermined threshold. The method further includes applying an assortment optimization model to generate an assortment recommendation for the item category at an identified retail location based at least in part on a set of items within the item category available at the identified retail location, a sales forecast for items in the set of items, a customer loyalty factor, the one or more item substitution pairs, and one or more physical constraints specific to the retail location.

In a second aspect, a system includes a computing system comprising one or more processors communicatively coupled to a memory subsystem that stores instructions. When executed, the instructions cause the one or more processors to: obtain transaction data regarding an overall item assortment of a retailer; identify one or more item substitution pairs within an item category of the overall item assortment based at least in part on the transaction data and item data describing items in the item assortment, the item substitution pairs being identified as having a substitutability score above a predetermined threshold; and apply an assortment optimization model to generate an assortment recommendation for the item category at an identified retail location based at least in part on a set of items within the item category available at the identified retail location, a sales forecast for items in the set of items, a customer loyalty factor, the one or more item substitution pairs, and one or more physical constraints specific to the retail location.

In a third aspect, an item assortment management system includes a computing system comprising one or more processors communicatively coupled to a memory subsystem that stores instructions. When executed, the instructions cause the one or more processors to: obtain transactional data regarding an overall item assortment of a retailer, and, for items within an item category, training a model comprising a graph convolutional network suitable for weighted graphs to learn embeddings for nodes representing potentially substitutable items, the model generating a graph having edge weights corresponding to a degree of substitutability between items and being based at least in part on the transaction data and item data describing items in the item assortment. The instructions further cause the one or more processors to: identify one or more item substitution pairs within the item category based on the degree of substitutability being greater than a threshold, and generate an optimized item assortment for a retail location of the retailer, the retail location being sized to stock fewer than all of the items in the overall item assortment, wherein the optimized item assortment is based at least in part on a set of items within the item category available at the identified retail location, a sales forecast for items in the set of items, a customer loyalty factor, the one or more item substitution pairs, and one or more physical constraints specific to the retail location. The instructions further cause the one or more processors to: receive a request for an item in the item assortment that is excluded from the optimized item assortment, the request being for a same-day purchase of the item from the retail location; and present, in a user interface, a recommendation of an item within the optimized item assortment that is in stock at the retail location.

BRIEF DESCRIPTION OF THE DRAWINGS

FIGS. 10A-C illustrate example performance datasets for different item substitution techniques useable in conjunction with the present disclosure.

DETAILED DESCRIPTION

Figure 1:
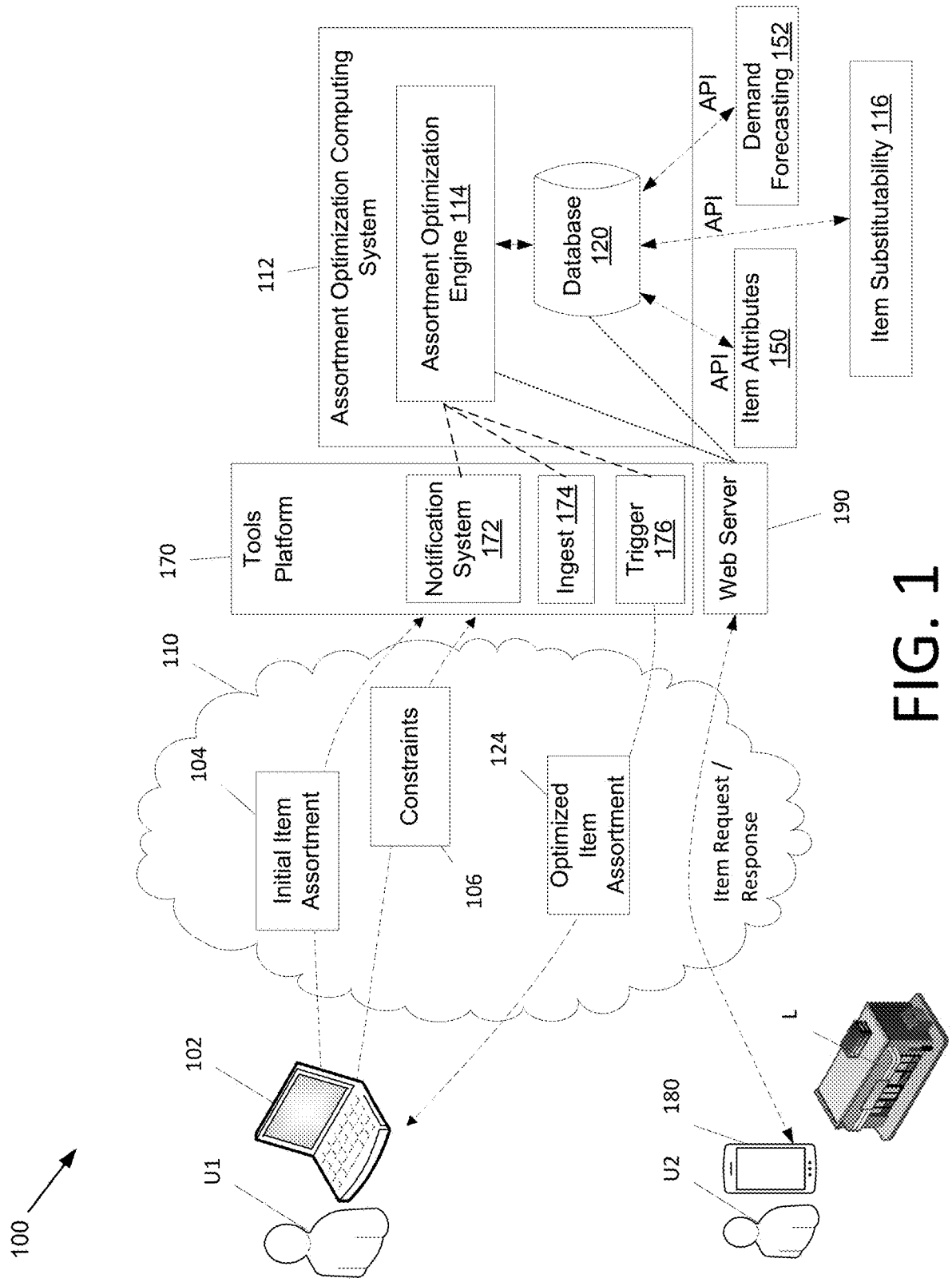
FIG. 1 is an illustration of an example environment in which aspects of the present disclosure may be performed.

As briefly described above, embodiments of the present invention are directed to methods and systems for assortment optimization and product fulfillment. By using particular modeled item substitution analyses, an optimized assortment may be generated by substituting items where constraints otherwise would not allow all items to be stocked due to, e.g., physical space constraints. Additionally, where a particular item is sought at a retail location, the same item substitution analyses may be used to determine an appropriate suggested alternative item within the assortment of items stocked at the retail location.

In example aspects, item substitutability may be determined using a process implementing a Graph Convolutional Network with unsupervised loss. An example of such an item substitutability technique is described in the attached Appendix, and further described in U.S. patent application Ser. No. 16/778,158, entitled "Item Recommendations Using Convolutions on Weighted Graphs", filed on Jan. 31, 2020, the disclosure of which is hereby incorporated by reference in its entirety. This approach has a number of advantages when applied in the context of determining an appropriate item assortment, including addressing data sparsity issues that would otherwise be present if, for example, item sales data were exclusively used to determine item substitutability. In alternative aspects, other approaches, such as use of embeddings that are based on attribute descriptions of products, could also be used to address the sparsity issue.

Upon completion of such an item substitutability assessment, an assortment may be selected based on item substitutability across a range of products, and based on constraints set on an overall item collection (e.g., required products or categories, overall space in which the item assortment must be held or displayed, excluded products or categories, etc.). Example methods of selecting an item assortment are provided in U.S. patent application Ser. No. 16/025,066, entitled "Method and System for Optimizing an Item Assortment", filed on Jul. 2, 2018, the disclosure of which is also hereby incorporated by reference in its entirety.

Overall, generation of an item assortment using the item substitutability and item assortment optimization techniques described herein have a number of advantages. For example, use of item substitutability analyses that may accommodate sparse sales or user selection data improves the ability of the overall system to identify substitutable products and degree of substitutability, which allows for improved decisionmaking when narrowing from an overall set of available products to a subset of those products to be carried at a physical retail location. Furthermore, item substitutability methods described herein allow an item fulfillment system to better present recommended substitute items to a user in circumstances where that user is seeking a particular item from within a retailer's item assortment that is not available at a particular retail location, or which may otherwise be out of stock. As described herein, such improvements address deficiencies that naturally occur in a large product dataset due to lack of complete sales information that would typically otherwise be used for substitutability determinations.

I. Overall System for Assortment Optimization and Product Fulfillment

Referring to FIG. 1, a diagram of an example system 100 in which an item assortment can be optimized, and in which product fulfillment may be improved, is illustrated. In the example shown, a computing device 102 operated by a user U communicates an initial item assortment 104 and a set of constraints 106 to the computing system 112 through a network 110. The computing system 112 includes at least an assortment optimization engine 114 and accesses data from one or more databases 120. The assortment optimization engine 114 determines an optimized item assortment based on the initial item assortment 104, constraints 106, and item data received from the databases 120. The optimized item assortment 114 is communicated from the computing system 112 to the computing device 102 through the network 110.

In the example shown, a tools platform 170 provides an interface between the computing device 102 and computing system 112, and passes messages therebetween via network 110. The tools platform 170 mediates messages passed to the computing system 112 such that many computing devices 102 can transmit requests to and receive data from the computing system 112 concurrently. As shown, the tools platform 170 includes a notification system 172, an ingest service 174, and a trigger 176, each of which are described below.

The computing device 102 operates to present a user interface to a user U. The user U provides inputs to the computing device 102 by use of a mouse, a keyboard, a touchscreen, and the like to make selections. The selections include at least selecting an initial item assortment 104 and one or more constraints 106 to apply to the item assortment 104. Additional selections include choosing an item universe and desired priority for applying constraints to the optimization. One example of a user interface is further described with respect to FIG. 16, below, and can be generated using the computing device 102, the computing system 112, or a combination thereof. The computing device 102 also receives the optimized item assortment 124 and can display it for the user U. In some embodiments, the optimized item assortment 124 is output in a format useable for downstream functions such as planogram planning. An example of the computing device 102 is further described with respect to FIG. 2.

In the embodiment shown, the initial item assortment 104 and constraints 106 are communicated to the computing system 112 through the network 110. The network 110 can be any of a variety of types of public or private communications networks, such as, for example, the internet. In some embodiments, a computation trigger microservice, shown as trigger 176, is utilized to communicate requests from the user U to the computing system 112. In example embodiments, the computation trigger microservice is an application developed to allow configuring and triggering Oozie workflows through a common HTTP and JSON-based interface. Data from user-generated HTTP requests is used to make calls to the assortment optimization engine 114 for executing a workflow with the required configuration for the request.

After the assortment optimization engine 114 has determined an optimized item assortment 124, the optimized item assortment 124 is communicated back to the computing device 102 through the network 110. In some embodiments, a notification system 172 is utilized to communicate the status and results of the assortment optimization process. An ingest service 174, implemented as a Kafka topic, provides updates on the state changes of the workflow being executed by the assortment optimization engine 114. Computations will push notifications to this topic as the last step of a workflow, indicating the successful or failed completion of execution.

The computing system 112 includes an assortment optimization engine 114. The assortment optimization engine 114 receives the initial item assortment 104 and constraints 106 from the computing device 102. The assortment optimization engine 114 also accesses data from one or more databases 120. The data includes item data such as item attributes, demand forecasting data, demand transfer data for pairs of items, and repeat purchase data. The databases 120 may be external to the computing system 112, or may be housed within the computing system 112. The assortment optimization engine 114 operates to calculate and determine an optimized item assortment 124 based on the constraints and item attributes of the assortment. The optimized item assortment 124 is output and communicated back to the computing device 102 through the network 110. The computing system 112 is further described with respect to FIG. 3.

In the embodiment shown, data is received at the database 120 via one or more Application Programming Interfaces ("APIs") connected to external services. As shown, the APIs expose services including an item attributes service 150, and a demand forecasting service 152. The item attributes service 150 supplies information regarding items available to be included in an assortment, including name, cost, SKU, and various other properties. The demand forecasting service 152 provides, in response to an identification of an item, a location, and a time period, a forecasted demand for that item.

In some examples, the database 120 may receive other types of information, such as demand transfer information from a demand transfer service. Such a demand transfer service provides information regarding transferability of item demand across pairs or groups of items. An example of a demand transfer service is described in copending U.S. patent application Ser. No. 15/582,244, filed on Apr. 28, 2017, the disclosure of which is hereby incorporated by reference in its entirety.

In the embodiment shown, an item substitutability service 116 may also be connected to the database 120, for example via an API. The item substitutability service 116 may be used in place of, or in addition to, a demand transfer service as described above. Specifically, the item substitutability service 116 may obtain information regarding an item collection stored in the database 120 that is available across an entire enterprise. The item substitutability service 116 may use items selection data, such as sales data, in addition to item attributes, to generate substitutability scores between pairs of items included within the item collection. In some instances, the item substitutability service 116 generates substitutability scores in the form of a weighted graph for a subset of the item collection, such as within a particular item category.

As described further below, the item substitutability scores may be used by the assortment optimization engine 114 to assist in optimizing an assortment of items that may be stocked at a particular retail location of the overall retail enterprise. Because of space constraints present in physical retail locations, fewer than all items in the item collection will typically be stocked at a physical retail location. By analyzing item substitutability based on both item attributes and item selection activity, such as sales, similarity scores can be generated between pairs of items for which there would otherwise be insufficient sales data to reach a conclusion regarding substitutability. Accordingly, an overall assortment at an individual retail location may be improved through use of improved substitutability analyses.

In this context, it is recognized that a retail enterprise may have a number of retail locations. Each retail location may have different constraints, or different sets of sales activity associated therewith. Accordingly, each retail location may be configured using a different optimized assortment, in conjunction with the principles described herein.

Also shown in FIG. 1, a second user U2 may interact with the retail enterprise electronically, for example via a mobile device 180 or other computing device. The user U2 may communicate with a web server 190 to view items available for purchase. The items available for purchase may be shipped from the retail enterprise, or may be picked up by the user from a retail location, e.g., retail location L. Depending on whether the item selected by user U2 is shipped from the retailer or is provided from retail location L, different item collections may be available. For example, a user U2 may wish to purchase a non-perishable item from the retailer, which may be shipped from a warehouse, and therefore may be included within an overall item assortment of the retail enterprise. However, the user U2 may also wish to purchase a perishable item from the retailer for same day delivery, or order pickup. The user may also simply wish to browse items specific to a particular retail location of the retail enterprise. In this case, the same day delivery will be associated with a particular location L near the user, or identified by the user. In this instance, the user U2 may attempt to select an item which is not within the inventory of the retail location L. In accordance with some embodiments, the user U2 may be presented with a user interface suggesting the alternative, or substitute items based on substitutability analyses performed via the item substitutability service. An example of such a user interface is provided below in FIG. 17.

Figure 2:
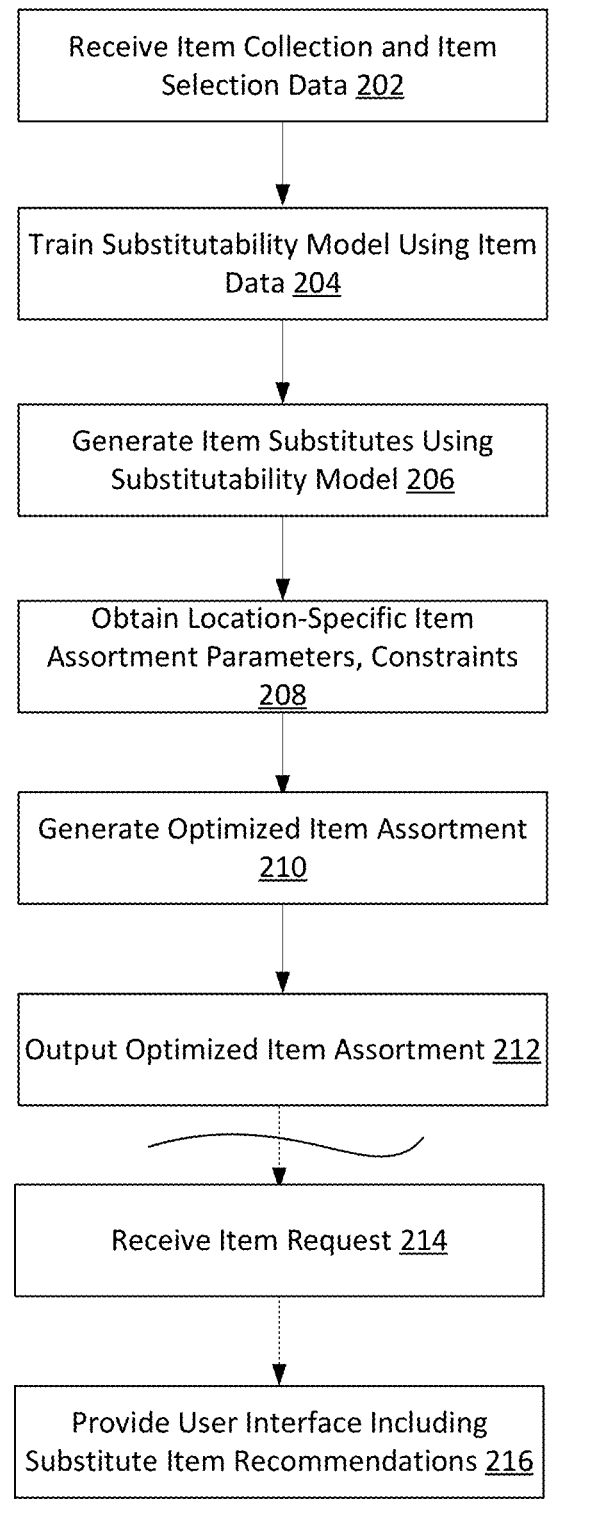
FIG. 2 illustrates a flowchart of an example method of optimizing an assortment and fulfilling product requests within such an optimized assortment, according to example embodiments of the present disclosure.

Referring now to FIG. 2, an example method 200 of managing item assortments and providing item substitutes from such assortments is described. The method 200 utilizes the item substitutability and assortment optimization analyses described herein, and may be performed, for example, using one or more of the assortment optimization computing system 112, item substitutability service 116, web server 190, or other computing devices 102, 170, 180.

In the example shown, the method 200 includes receipt of an overall item collection, and optionally item selection data (step 202). The overall item collection may be a complete collection of items offered by a retail enterprise, from among which a subset will be selected for stocking at a particular retail location. The overall item collection includes item identifiers, but also includes other item descriptive information such as item classification, item title, item description, and other types of item information. The item selection data may include, for example, transaction data regarding item sales, as well as item selection data from a retail website.

The method 200 further includes training a substitutability model using the item data, and optionally also the item selection data (step 204). In example embodiments, the substitutability model can be a graph convolutional network utilizing weighted graphs. Details regarding such a substitutability model are provided below. However, in other embodiments, other substitutability models may be used. For example, a locality sensitive hashing (LSH) approach may be used two hash similar items into a common bucket with high probability of interchangeability. Word embeddings based on titles and descriptions of items may be used to establish similarity, such as may be provided by a word2vec model trained on item information. Still further, an association score between two items in a different category may be generated using solely a transaction data set of items selection data. Each of these alternative approaches are also described below.

In the example shown, the method 200 further includes generating a set of item substitutes using the selected substitutability model (step 206). The set of item substitutes may be generated across the entire item collection, or may alternatively be generated within each item category or a subset of item categories. In the examples described below a particular item category is illustrated. For example, while and overall item collection may include items in a number of categories, comparisons among items may be limited two items within the same category, e.g., cookies, to simplify computational demands.

The method 200 also includes obtaining location specific item assortment parameters and constraints (step 208). The item assortment parameters may include, for example: mandatory items that must be stocked within a given item category; a maximum number of items that should be stocked for a particular item category; a minimum number of items that should be stocked for the particular item category; the specific location for which the optimized assortment is generated; a threshold for item loyalty, a above which not be substituted for another item due to strong customer preference. Other restrictions or parameters on item assortments may be introduced as well.

In the example shown, the method 200 also includes generating and optimize item assortment (step 210). The optimized item assortment will generally be a subset of the overall item collection available within the retail enterprise, and will be optimized for a particular location based on the parameters and constraints defined for that location. The optimized item assortment may then be output (step 212), for example via an API to a remote system for store plan development, or return to a user via a user interface for various purposes.

In the embodiment shown, the method 200 may also include, at some other time to the assortment optimization aspects described above, receiving an item request from the user (step 214). The item request from the user may be, for example, a request for delivery or pickup of an item from a particular retail location of the retail enterprise. Based on the item identified in the request not being stocked at the specific retail location (e.g., Due to the item being currently out of stock or being not included within the optimized item assortment for that location), the user may be presented with a user interface (step 216), for example generated by a web server in cooperation with an assortment optimization computer and or item substitutability data. The user interface presents the selected item in association with one or more substitute items that could be selected for purchase from the retail location instead of the searched-for item. The user may then be presented with an option to pick up or have delivered (e.g., via a same-day delivery service) the substitute item.

As will be further explained below, the methods described herein and provide significant advantages in terms of being able to first identify substitutes within data where transaction records may be sparse (e.g., there are sparse sales of particular items, or at least insufficient sales to identify substitutes based solely on item demand). These item substitutes may be used to efficiently selected an item assortment for a particular location, as well as present users with alternatives if a particular item is selected but unavailable at the particular location. Details regarding analyses for item substitutability, assortment optimization, and applications thereof are provided below.

II. Item Substitutability

Figure 5:
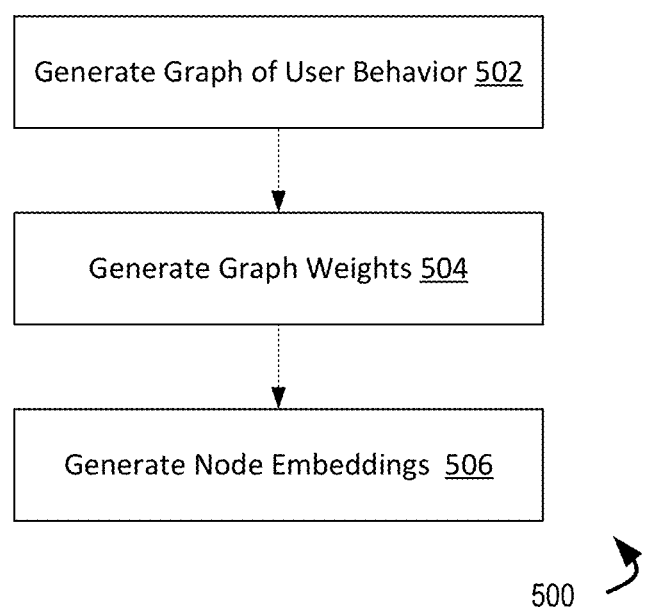
FIG. 5 illustrates a flowchart of a method for initializing a model useable to generate recommended items from within an item collection.
Figure 6:
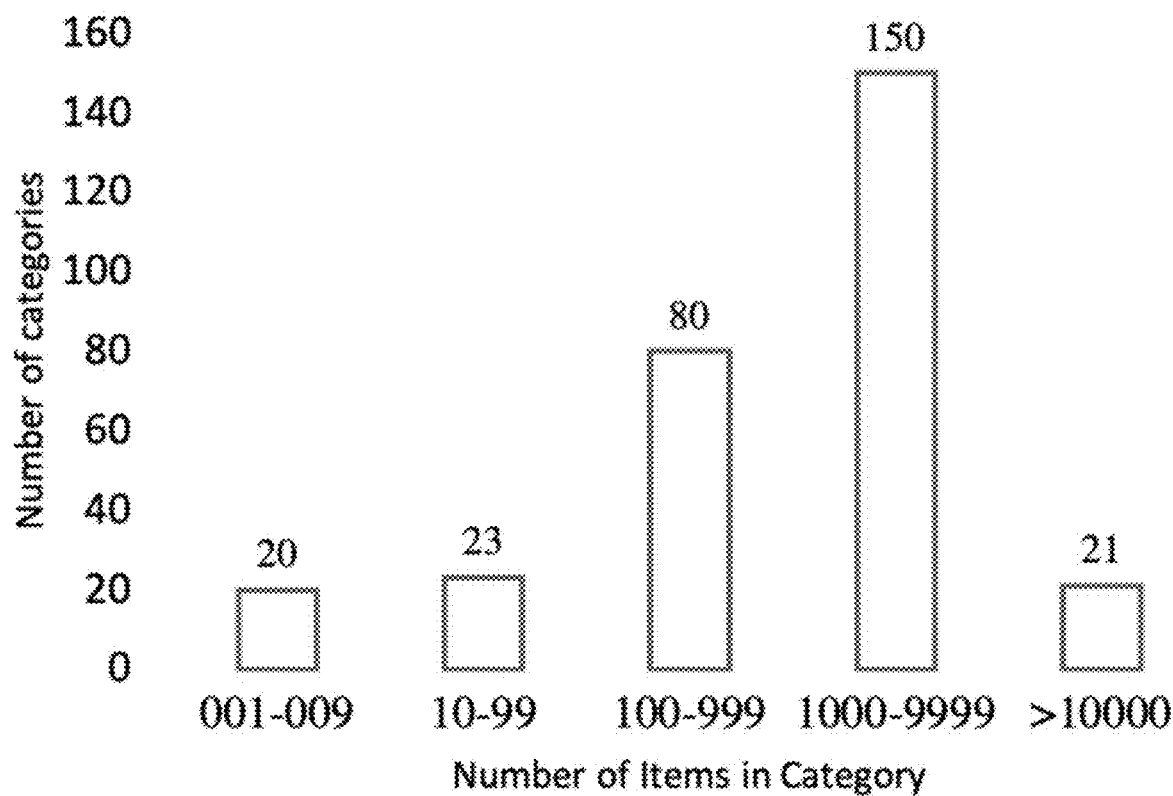
FIG. 6 illustrates a graph of characteristics of an example overall item assortment available from a retailer, in an application of the methods and systems described herein.
Figures 7, 8:
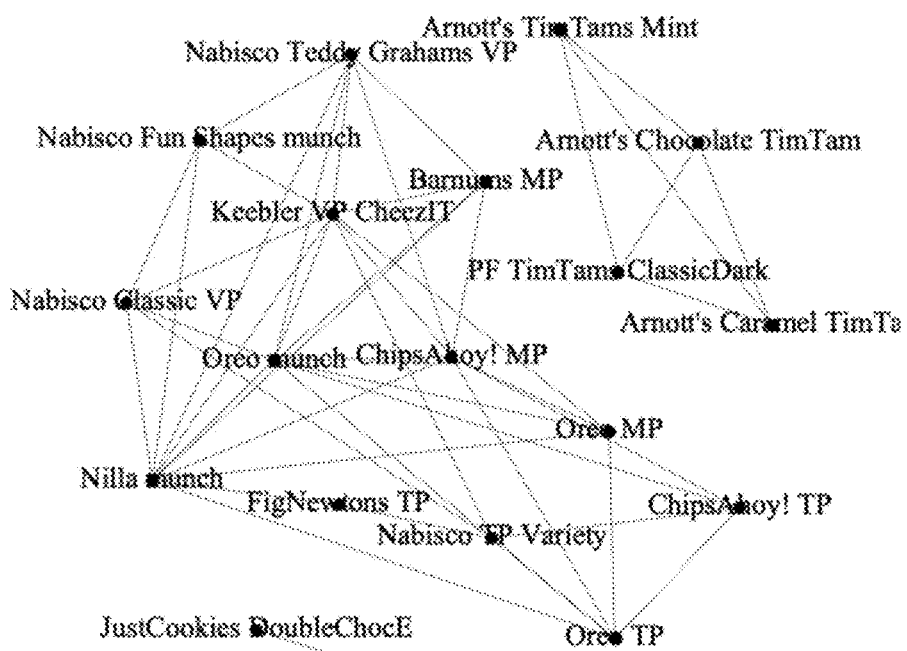
FIG. 7 illustrates a chart of example item selection data for items within an item category useable to determine item substitutability, in accordance with an example embodiment.
FIG. 8 illustrates an example graph of related items within an item category for purposes of determining item substitutability, in accordance with an example embodiment.
Figure 9:
FIG. 9 is a sampling of example items considered for possible substitutability within an item assortment, in accordance with an example embodiment.
Figure 9:
Figure 9:
Figure 9:
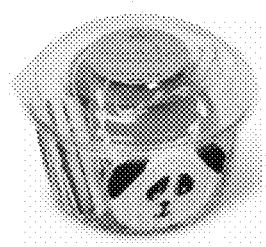
Figure 9:
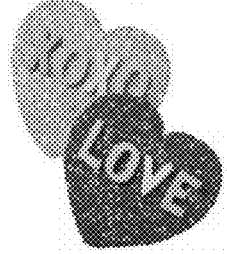
Figure 9:
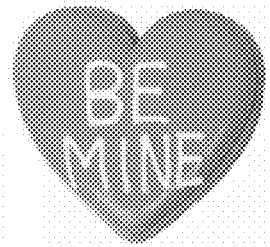

Referring now to FIGS. 3-11, details regarding example methods for identifying item substitutes within an item collection are provided. FIGS. 3-7 specifically relate to a method using a convolutional neural network using weighted graphs, which is implemented in some example embodiments of the present disclosure. FIGS. 8-9 illustrate example items that may be analyzed across various substitutability analyses that can be implemented; alternative substitutability analyses are described in the context of those Figures. FIGS. 10A-C and FIGS. 11A-C illustrate example test results comparing the outcomes of various substitutability analyses, which are then used in a subsequent assortment optimization process (described in Part III).

Referring to each of the substitutability models considered, purchase session data can be used to create a network of substitutable items for every category by evaluating a metric association score given by the following:

$$\text{AssociationScore}(A \rightarrow B) = \frac{|A \cap B| N}{|A||B|}$$

In this context, |A∩B| is a total number of customers who buy both items A and B, and |X| is the total number of customers who buy only item X. N is the total number of customers in the transaction dataset. Two items may be considered substitutable if:

AssociationScore(A→B)>1

In other words, if the customer has bought item B then that increases the chance of buying item A. In at least some of the substitutability models described herein, a combination of this behavioral model construct with a model based on item data itself may be used to extend behavioral data to areas of data where substitutability evidence is sparse in the behavioral data itself.

Figure 3:
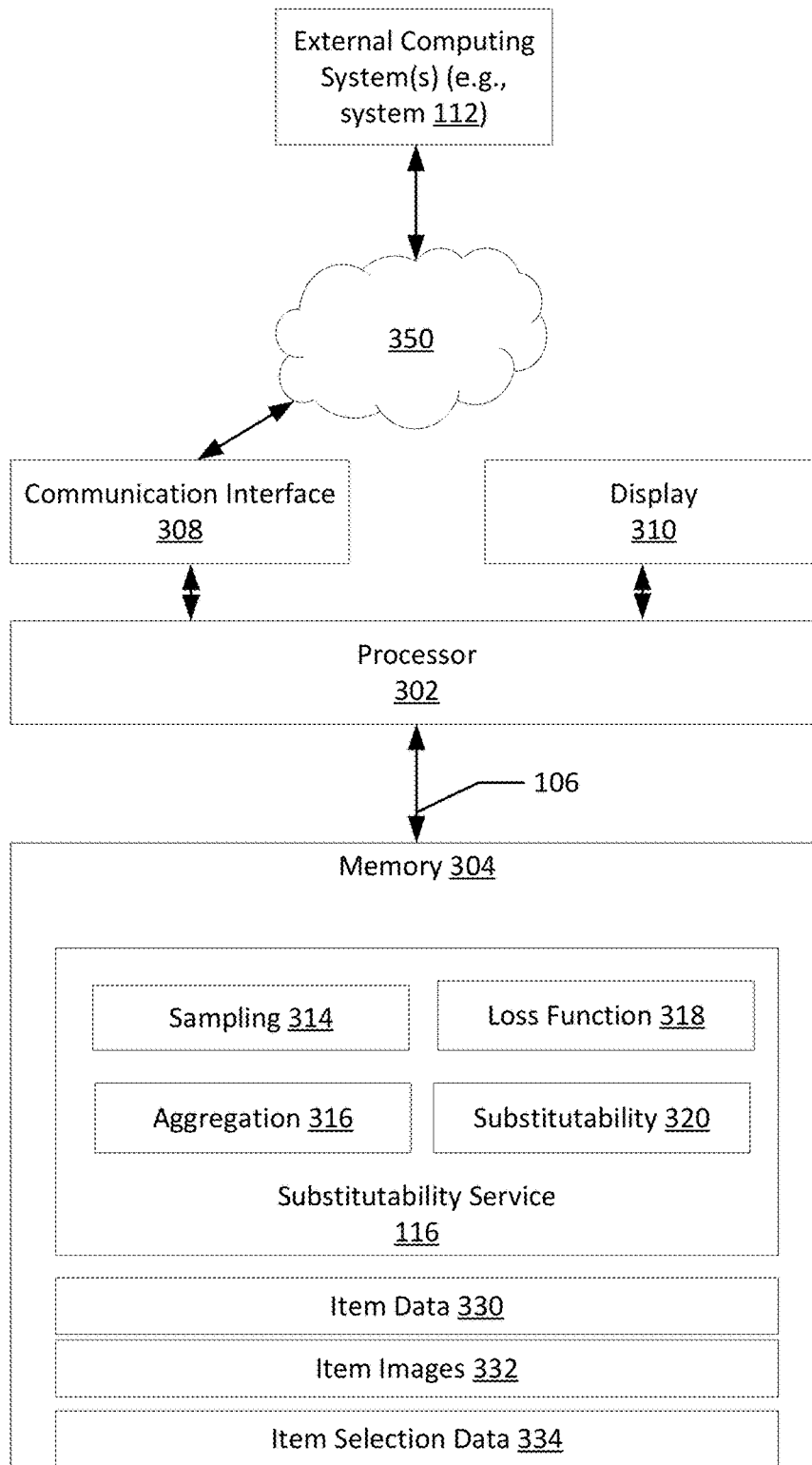
FIG. 3 illustrates a system for presenting items in an online environment, and in particular in a retail context, according to an example embodiment.

Regarding a first possible substitutability model approach, FIG. 3 illustrates an example block diagram of a virtual or physical computing system 300 that may be used to analyze substitutability using a convolutional neural network using weighted graphs. The computing system 300 may be communicatively connected to a remote system, such as the assortment optimization system 116 of FIG. 1, or the web server 190 of FIG. 1 to provide substitutability information directly thereto. The computing system 300 may be interconnected therewith via a network 301, such as the internet.

The computing system 300 includes a processor 302 communicatively connected to a memory 304 via a data bus 306. The processor 302 can be any of a variety of types of programmable circuits capable of executing computer-readable instructions to perform various tasks, such as mathematical and communication tasks.

The memory 304 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 304 stores a substitutability service 112, as depicted in FIG. 1. The computing system 300 can also include a communication interface 308 configured to receive and transmit data, for example to access data in an external database, or to provide such item recommendations to a retail web server 190 for presentation to a user device 180. Additionally, a display 310 can be used for viewing information generated by substitutability service 112.

In various embodiments, the substitutability service 112 performs a process including sampling, weighting, and aggregation of graph-based data, generated from a combination of image data 330, item data 332 (e.g., text descriptions of items), and user selection data 334 (e.g., page or item views, item selections, purchases, etc.). Details regarding use of such data is provided below.

In one example embodiment, the substitutability service 112 includes a sampling subsystem 314, an aggregation subsystem 316, a loss function 318 and a substitutability subsystem 320.

In the embodiment shown, the sampling subsystem 314 performs a graph sampling using a graph convolutional network (GCN). GCNs perform propagation guided by a graph structure. Accordingly, for any particular node, neighbors are selected for convolution. In an example embodiment described below, a subset of neighbors for any given node is selected based on edge weights of neighbors. Generally, the larger the weight of the edge, the greater the chances that a corresponding neighbor should be selected for sampling.

In the embodiment shown, the aggregation subsystem 316 obtains the selected neighbors for aggregation to the corresponding nodes for information clustering. This can include, for example, incrementally adding information from neighboring nodes while accounting for edge weights between the node and the neighboring node. Example aggregation functions can include a mean aggregator, an LSTM aggregator, a pooling aggregator, node2vec, or GCN. Other aggregation functions are useable as well.

In the embodiment shown, the loss function 318 is applied to output representations of the aggregation, and trains weight matrices and parameters of the aggregator functions using a stochastic gradient descent. Accordingly, the graph-based loss function encourages nearby nodes to have similar representations, while enforcing that representations of the disparate nodes are distinct.

In the embodiment shown, the substitutability subsystem 320 receives the model generated using the sampling subsystem 314, the aggregation subsystem 316, and the loss function 318. The substitutability subsystem 320 utilizes a model generated from the other subsystems and can receive an identification of an item within an item collection, e.g., from a retail web server 190. The substitutability subsystem 320 can then utilize the model to identify one or more substitute items in response, which can be provided to the retail web server 190 for presentation to a user, as described below.

Notably, the item collection on which the selection of items is generated may be modified relative to an item collection from which the model is generated (e.g., due to addition of items or removal of items. Accordingly, although an overall item collection may change over time, substitutability scores may be generated for that entire collection of items, including those which have been added since the initial (or an updated) item collection model was created.

Figure 4:
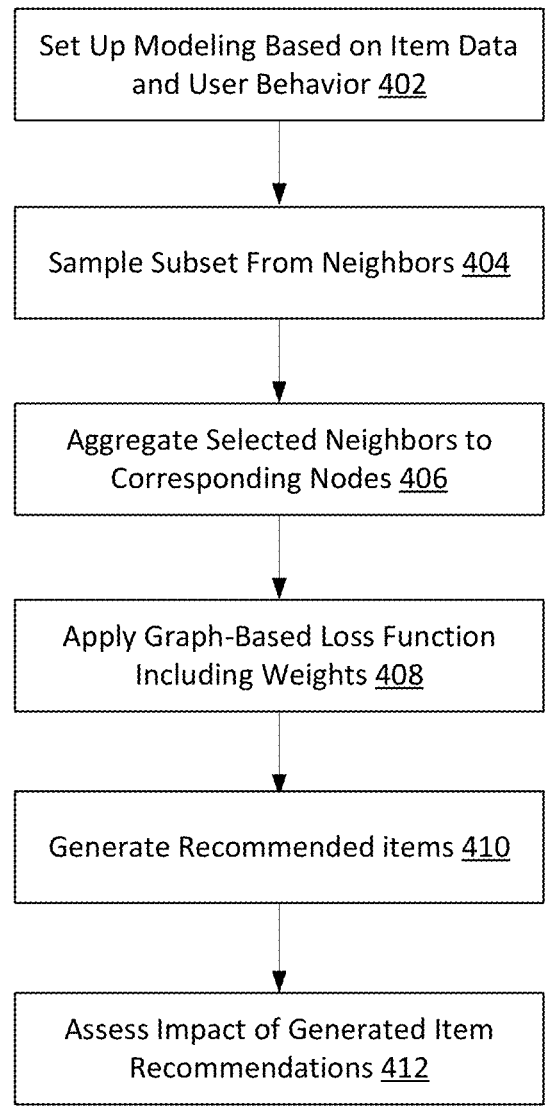
FIG. 4 illustrates a flowchart of a method for identifying recommended items from within an item collection, according to an example implementation.

FIG. 4 illustrates a flowchart of a method 400 for assessing substitutability from within an item collection, according to an example implementation. The method 400 can be performed using the substitutability service 116 of FIG. 1, above, and in particular the computing system 300 of FIG. 3. In particular, the method 400 can be used to identify items that are in some way related to an initially selected item.

In the embodiment shown, the method 400 includes setup for modeling useable to generate item substitutability scores (step 402). Setup can include, for example, generating a weighted graph of items in an item collection. The weighted graph can be generated based on item information and item selection information. For example, a graph can be generated from item images and item descriptions, with weights between items being generated based on item selection information (e.g., the likelihood that a user selecting one item would be willing to select another item from within the item collection). The item selection information can be based on user activity such as page views, item selections, purchases, etc. from a retailer website providing access to the item collection.

In example embodiments the weights applied to the graph can be generated in a number of ways. Generally each item represents a node, with relationships between nodes being weighted. Such weights may be, for example, generated based on a Jaccard index or based on weighted co-occurrences.

Additionally, node embeddings are generated for each node, based on information available about that node. In example embodiments, node embeddings can be generated based on all or some portion of the item data available. In the case of retail items available on a retail web server, item information can include text information (e.g., item descriptions) and image information. Other information may be utilized as well.

Continuing with FIG. 4, the method 400, in the embodiment shown, includes performing a sampling operation on the weighted graph (step 404). Specifically, a neighbor function, N(v), samples a subset of any given node $v \in \mathcal{V}$ based on the edge weights of its neighbors. In the case of product substitutions, the larger the weight of the edge, the more chances that the corresponding neighbor should be selected in sampling.

By way of contrast to existing systems, which select neighbors randomly and according to a uniform distribution, in the present disclosure neighbors are selected with a probability proportional to $s(u, v)^\beta$, where $s(u, v)$ is a weight of the edge and $\beta$ is a sampling degree parameter. The larger the weight of the edge, the greater the chance that a corresponding neighbor should be selected in sampling. When $\beta=0$, application of edge weights is neutralized, while larger values of $\beta$ imply that only neighbors with large edge weights will be selected. In an example embodiment, pseudocode for such a sampling algorithm may be depicted as follows:

---

Input: Graph $\mathcal{G}(\mathcal{V}, \mathcal{E})$ and a weight function $s(u, v)$ for any $(u, v) \in \mathcal{E}$, a sampling hyper-parameter $\beta$
Output: Graph with homogeneous number of neighbors.
for each $u \in \mathcal{V}$ do
    $\omega(u, v) = ks(u, v)^\beta$, $\forall v \in \mathcal{V}$ s.t.$\Sigma_{all v} \omega(u, v) = 1$
    sample $v \in \mathcal{V}$ based on $\omega(u, v)$
end for

---

Still continuing with FIG. 4, the method and 400 includes aggregating selected neighbors to corresponding nodes (step 406). In the aggregating operation, if there are two sources of input features (e.g., text and images, as in the example embodiments described herein), those two sources of input features can be combined as follows: $x_v = \sigma(x_{v1} + W^0 \cdot x_{v2})$, $\forall v \in \mathcal{V}$; where $W^0$ is a linear transformation matrix to ensure xv1 and xv2 in the same dimension and is a trainable parameter in training. Additionally, $\sigma$ is a nonlinear element wise function.

After sampling, the selected neighbors need to be aggregated to their corresponding nodes for information clustering. The aggregation step is similar to convolution over nearby pixels in images and has the goal of aggregating information from neighboring nodes. However, a node's neighbors have no particular or natural ordering in graphs. Aggregators are used to aggregate all the neighboring nodes at same distance.

Accordingly, at each iteration, or search depth, nodes aggregate information from their local neighbors. As this process iterates, nodes incrementally gain more and more information from further reaches of the graph from their neighbors. However, unlike prior works, a hidden state $h_u^{k-1}$ is discounted using the edge weight in aggregation to the state of node v. A multiplicative factor $s(u, v)^\gamma$ can be used to incorporate the importance of item-to-item view dependency so that higher weights are aggregated more than lower weights. An additional parameter, $\gamma$, also defines the extent to which neighbor weighting affects modeling. When $\gamma=0$, the multiplicative factor is neutralized; for larger values of $\gamma$, neighbors with higher weights contribute more to the aggregation. In an example embodiment, pseudocode for such an aggregation algorithm may be depicted as follows:

---

Input: Graph $\mathcal{G}'(\mathcal{V}', \mathcal{E}')$: input features $\{x_v, \forall v \in \mathcal{V}\}$; depth K; weight matrices $W^k$, $\forall k \in \{1,...,K\}$; non-linearity $\sigma$; differentiable aggregator functions $\pi_k$, $\forall k \in \{1,...,K\}$;
neighborhood function $\mathcal{N}: \mathcal{V} \to 2^\mathcal{V}$ : edge weight function $s(u, v)$, $\forall (u, v) \in \mathcal{E}$,
Output: Vector representations $z_u$ for all $v \in \mathcal{V}$
$h_v^0 \leftarrow x_v / \|x_v\|$, $\forall v \in \mathcal{V}$,
for each $k \in \{1,...,K\}$ do
  for each $v \in \mathcal{V}$ do
    $h_{\mathcal{N}(v)}^k \leftarrow \pi_k(\{w^\gamma h_u^{k-1}, \forall u \in \mathcal{N}(v)\})$   (5)
    $h_{\mathcal{N}(v)}^k \leftarrow h_{\mathcal{N}(v)}^k / \|h_{\mathcal{N}(v)}^k\|$
    $h_v^k \leftarrow \sigma(W^k, \text{CONCAT}(h_v^{k-1}, h_{\mathcal{N}(v)}^k))$
  end for
    $h_v^k \leftarrow h_v^k / \|h_v^k\|$
end for
    $z_v \leftarrow h_v^K, \forall v \in \mathcal{V}$

---

As seen in the above, the aggregation function $\pi_k$, $\forall k \in \{1, \ldots, K\}$ could be any of a number of aggregation functions, such as a mean aggregator, a long-short term memory (LSTM) aggregator, a pooling aggregator, a node2vec algorithm, or a graphical convolutional network (GCN). Other aggregation functions could be used as well. Additionally, $\sigma$ represents a softmax function and W represents a trainable model parameter, in the above.

Continuing with FIG. 3, a graph-based loss function is applied to the output representations $z_u$, $\forall u \in \mathcal{V}$ of the aggregation (step 408). The weight matrices $W_k$, $\forall k \in \{1, \ldots, K\}$ and parameters are the aggregation functions are trained via stochastic gradient descent. The graph-based loss function encourages nearby nodes to have similar representations, while enforcing that representations of desperate nodes remain distinct:

$$\mathcal{L}_\mathcal{G}(z_u) = -r(u,v)^\alpha \log(\sigma(z_u^T z_v \cdot Q \cdot \mathbb{E}_{v_n \sim P_n(v)} \log(\sigma(-z_u^T z_{v_n})),$$

In this loss function representation, v is a node that co-occurs near u on a fixed length random walk, $\sigma$ is the sigmoid function, $P_n$ is a negative sampling distribution, and Q defines the number of negative samples. Additionally, $r(u, v)$ is an accumulated mean of the weights on the random walk for node u and v and $\alpha$ is another hyperparameter to be tuned for the exponential degrees of weights on random walks. In an example implementation, a geometric mean of weights along the random walk is used for $r(u, v)$. Other selections could include, for example, arithmetic mean, maximum of weights of edges along the path. By adding the weights into the loss function, the algorithm becomes more focused on minimizing the distance between nodes u and v with larger edge weights.

Figure 17:
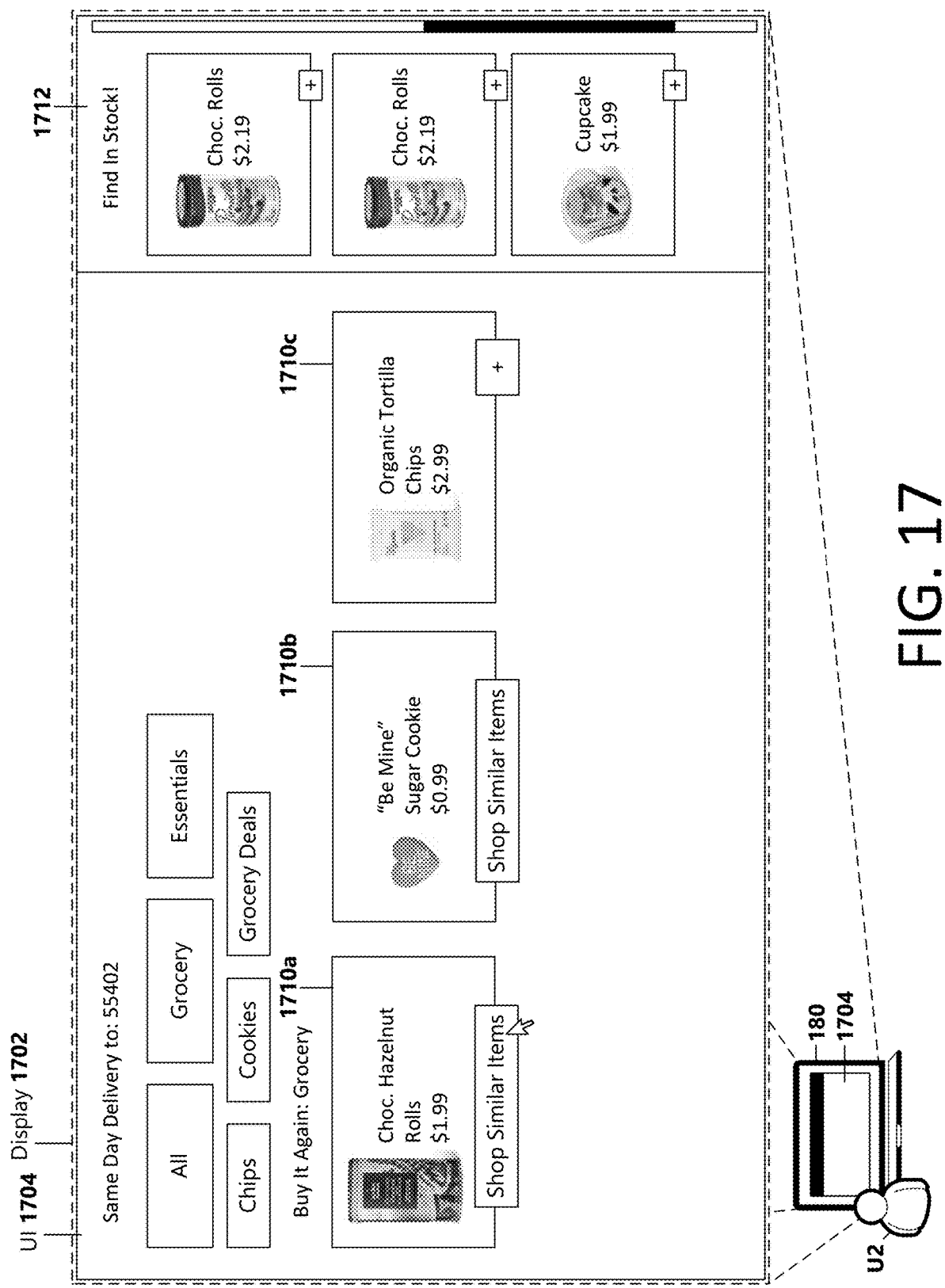
FIG. 17 illustrates a user interface for receiving item substitution suggestions within an item sub-assortment available at a particular retail location that is generated using the item substitutability analysis and assortment optimization techniques described herein.

Once the weighted loss function is applied, the output of convolution of the sampled weighted graph can be used to generate substitution scores for items (step 410). The substitution scores, and identified substitutable items can include one or more items representing neighbors of a selected item having scores above a predetermined threshold. The substitute item may be an item selected by receiving an identification of one item from a retail web server, and determining that one or more substitute items should be presented (e.g., due to the selected item being not stocked, out of stock, etc.). The returned item substitutes can be returned in the form of an item identifier for each nearest neighbors according to a predetermined threshold of one or more items to be recommended. In some instance, 2-4 or more items may be suggested to the user, as seen in FIG. 17, below.

In addition, optionally, within the method 400, impact of the generated item recommendations can be assessed (step 412). This may include, for example, determining a success rate or conversion rate for substitutions generated according to the methodology described herein. Such a rate of selection can be used to tune the parameters of a model generated as described herein, for example, to improve performance, or to compare to other substitutability approaches.

FIG. 5 illustrates a flowchart of a method 500 for initializing a model useable to generate substitutable item pairs from within an item collection, such as items within a retail website. The method 500 can be used, for example, to set up the weighted graph used in the methods and systems described above in connection with FIGS. 3-4. Generally, the method 500 can include generating a graph of user behavior (step 502). As noted above, a graph can be generated from item images and item descriptions, with weights between items being generated based on item selection information (e.g., the likelihood that a user selecting one item will select another item from within the item collection). The item selection information can be based on user activity such as page views, item selections, purchases, etc. from a retailer website providing access to the item collection.

The method 500 can also include generating graph weights (step 504). As noted above, this can be performed using, for example, a Jaccard index or weighted co-occurrences. In the instance of a Jaccard index, the edges of a graph are weighted according to past customer views. Accordingly, weights are provided on all edges, and are calculated based on relative frequency of views for each pair of items. An arctangent-based transformation of the relative frequency is then generated. For example, for online items i and j, the relative frequency can be depicted as:

$$F(i, j) = \frac{VC(i \cap j)}{VC(i \cup j)}$$

where VC(i∩j) is the number of guests that view items i and j in one session and VC(i∪j) is the view counts for either item i or j being viewed in a session. In an online retail context, the relative view frequency F(i,j) for items i and j is usually very small; for example a 3% common view is a relatively large number for a pair of items. Accordingly, the relative frequency is divided by a median of frequency in one category to scale to the weight function, s: ($\mathcal{V}$, $\mathcal{V}$ →(0, 1). Accordingly, a weight function can be represented as:

$$s(i, j) = \frac{2}{\pi} \times \arctan\left(\frac{F(i, j)}{\text{median of } F}\right).$$

After this transformation, the weights are closer to a uniform distribution between 0-1.

In the case of weighted co-occurrences being used to generate weights, co-view counts are not the only action used; rather, other actions, such as adding an item to a cart or ultimately purchases of the two items together are features that are also utilized. In this example, different activities by a user are weighted using empirically determined weights. Additionally, a time delay on co-occurrences can be applied to capture the recency of items. In this example, weighted co-occurrence of products i and j for N customer session is given by:

$$s(i, j) = \sum_{s=1}^{s=N} W(i)W(j)/Rec(s)$$

where W(i) and W(j) are highest weights of products i and j in session s, and Rec(s) is recency of session s. Weights per node are then normalized and an arctangent transform is also applied to normalize the weights on a 0-1 scale. Other graph weighting approaches could be used as well.

Finally, the method includes generating node embeddings (step 506). This includes, for example, generating embeddings based on image data associated with the item, as well as embeddings based on text data associated with the item. In example embodiments, node embeddings include image embeddings that are generated using a pre-trained model, such as a VGG-16 model described in Karen Simonyan and Andrew Zisserman. *Very deep convolutional networks for large-scale image recognition. arXiv preprint arXiv:* 1409.1556, 2014. This publication is hereby incorporated by reference in its entirety. In such a model, a last fully connected layers are not used, but rather the output up to the convolutional layers and max-pool layers (i.e., the output of the average-pool layer, not the max-pool layer) is used. Item embeddings for text descriptions of the items are obtained by training a word embedding model on item attributes and descriptions included in an item collection. For example, item embeddings may be generated as described in: Tomas Mikolov, Ilya Sutskever, Kai Chen, Greg S Corrado, and Jeff Dean. *Distributed representations of words and phrases and their compositionality. In Advances in neural information processing systems*, pages 3111-3119, 2013. This publication is hereby incorporated by reference in its entirety.

Referring to FIG. 6, an example chart 600 representing features of a dataset used in conjunction with the substitutability assessments and assortment optimization processes described herein is provided. As seen in chart 600, a typical overall item collection may include a large number of categories and items within each category. For example, in a particular retailer dataset, there were 150 distinct categories of items in which more than 1000 items fell within the category. Still further, there exist over 80 categories in which over 100 items were members of the category. For a smaller subset of 21 categories, over 10,000 items were offered by the retailer. Obviously, not all of these items will be offered at a brick and mortar retail location. Use of a substitutability algorithm allows the retailer to narrow the set of items offered at a physical location to a more manageable size.

To determine substitutability, it can be difficult to infer from an item dataset alone, or from customer behavior alone. In an online world, it is easier to infer substitution based on similar items a guest viewed or added to cart before purchasing an item. This has been exploited to build a sequence of user item interactions which is used for context based recommendation algorithms. A significant portion of store transactions are done by identified guests (identified through loyalty program or usage of credit card transactions). A dataset shown in FIG. 7 looks to store purchases of identified guests to build offline sessions. Although an abridged dataset 700 is depicted, an overall dataset included transactions of over 100 million guests for a previous one year period to create offline sessions. Using the abridged dataset 700 as an example, a snapshot of a customer's purchases from the cookie category in 2019 is seen. We observe that across the four trips that were made to the stores, the customer bought Oreo Double Stuf Cool Mint, Oreo Original, Oreo Thins Mint. So the purchase session for this guest within cookies category for this snapshot of data would comprise the IDs [123; 234; 345]. Through this recreation of user activity, substitutability behavior can begin to be developed, using both customer activity and item characteristics.

In a particular application of the substitutability analyses described herein, FIG. 7 illustrates the use of a weighted graph within an item category to identify potential substitute items. In particular, the example graph 700 of FIG. 7 illustrates neighbor relationships that are identified among items within a grocery, cookie category. In particular, the graph 700 shows three subnetworks of the complete graph of substitutable cookies, (i) traypacks/multipacks, (ii) TimTams, and (iii) Just Cookies. The width and length of the edges is proportional to the weighted association score shared by the two items. Here, the three clusters of substitutable items do not share any edges indicating they are not to be considered as substitutable.

As seen in the collection of items 900 depicted in FIG. 9, example structured attribute data for items in the catalog may include of information regarding brand, flavor, health and wellness related attributes and other product features that were provided by the vendors in the catalog. Instead of behavioral data, it is tempting to just use item-attribute dataset (which also has full coverage over range of groceries) and use them to recommend substitutions. However, using pure attribute data may not lead to accurate results. Pepperidge Farm's Pirouette Creme Filled Wafers differ slightly in flavors (Chocolate Fudge versus Chocolate hazelnut). Using store-sale signals, we also infer that Archer Farm's Creme-Filled Rolled Wafer are highly substitutable but attribute-based methods fail to capture this nuance. Similarly, some sugar cookies were found to be substitutable with Valentine's day special cookies although item description doesn't mention the occasion/name 'Valentine'. Accordingly, in accordance with the substitutability model above (and those described below) a combination of item attributes and customer behavior can be used to extend the customer behavior across items where limited customer behavior exists that may otherwise indicate substitutability.

As noted above, in addition to the above convolutional neural network using weighted graphs, other types of analyses for item substitutability may be used. Such approaches include a behavioral model, a locality sensitive hashing (LSH) model, or a word embeddings model may be used. Combinations of each of these models may be used as well; the models are described briefly herein.

Regarding the behavioral model, Item-to-Item Collaborative Filtering was applied on store purchase behavior of customers for those categories. In order to apply Collaborative Filtering, sessions were created out of consecutive store visits of customers in which they bought any item from a given category. The association score metric was used for item-to-item Collaborative Filtering to obtain pairs of items that could be deemed as substitutable. So if a given product is out of stock, the product with the highest association score metric to the customer is recommended as a substitute, provided that item is available in that store.

While this approach is appropriate for some item types having high volume, this behavioral-based substitutability has relatively low product coverage. Accordingly, migration to use of a combination of behavior and item data, as in the weighted graph-based CNN approach above, are generally seen as preferable (as confirmed below).

In addition to the weighted graph-based CNN approach and a purely behavioral model, the locality sensitive hashing model (LSH) may be used. This approach hashes similar items into the same bucket with high probability. In example embodiments, a SimHash algorithm is used, for its comparative performance.

Regarding the word embeddings model, a typical word embedding process, such as word2vec, may be used to learn a real-valued vector representation for a predetermined fixed size vocabulary from a corpus of text. In this context, a word2vec model is generated from the item description and item attributes, which are considered as a sentence, with each attribute name and value being considered a word. This gives a unique representation to each attribute of an item. For example—Pirouette Crème Filled Wafers Chocolate Fudge Cookies may have attributes such as brand (Pepperidge Farm), flavor (chocolate fudge), state of readiness (ready to eat), package quantity (1), allergens (Contains: Wheat, soy, Milk, eggs, hazelnuts) and cookie type (Chocolate cookie). Once these embeddings are obtained, the mean is taken for each attribute to obtain embedding for the product. The similarity between generated embeddings are then used to generate substitutable items. While this provides some meaningful substitutability analysis, different attributes contribute differently to substitutability, and that is not well-captured using item description alone. For example, among razors, the retailer carries items from the same brand but targeting different genders so one has to be careful to ensure that if the customer was looking for Venus razors, they are not recommended Gillette for men since both the items share the same brand name. Hence, the attribute gender is very important for this category. However, for another category such as feminine products, this attribute is implicit. In the context of the present disclosure, manual weightings were applied to both the LSH and word2vec approaches.

In addition to the approaches described above, other natural language processing techniques could also be applied. However, those arrangements are generally more computationally intensive and tend to miss key attributes, such as gender, for product descriptions.

Figure 11A:
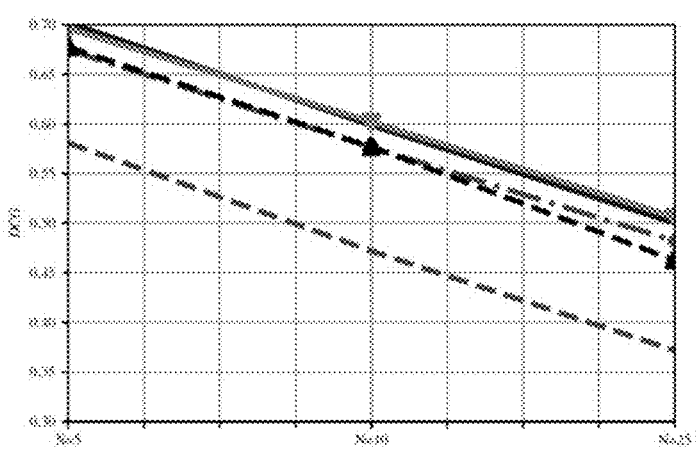
FIG. 11A-C illustrate additional example performance datasets for different item substitution techniques useable in conjunction with the present disclosure.

Referring to FIGS. 10A-C and 11A-C, the various substitutability approaches were assessed in the context of a guest browsing a website for grocery delivery and encountering out of stock scenarios. In this context, three different datasets were generated. First, a session dataset uses data from a month of online grocery browsing sessions is obtained and used to generate potential substitutions. Commonly browsed items are considered as possible substitutes. While this dataset, reflected in FIGS. 10A, 11A, is comparatively large, it will include a number of possible false positives in terms of substitutability. Second, as reflected in FIGS. 10B and 11B, an out of stock dataset is generated where an item is actually out of stock, and the customer views recommended alternative products. Third, as reflected in FIGS. 10C and 11C, an offline dataset was used which involves real-world scenarios in which guests ordered an item using a same-day delivery service, and it was determined to be out of stock after an order was placed. The substitute was picked up by the guest using a mobile application, or based on interaction with the same-day delivery service. This dataset was relatively smaller (on the order of 30,000 transactions, rather than 30+ million transactions in the first and second datasets) but is more tailored to substitutability.

As seen in FIGS. 10A-C, charts 1020, 1040, and 1060, respectively, show a HitRate defined as the percentage of times that one of the top-N recommendation was fulfilled by the customer. FIGS. 10A-C show performance across the three different datasets described above, with the performance of substitution algorithms for various values of N. Although a customer may only be presented with a top N (e.g., 5-10) recommendations, location specific unavailability of assortment (particularly in groceries) implies that a large number of recommendations seen offline may not be available online, or in an item substitutability context.

Figure 11B:
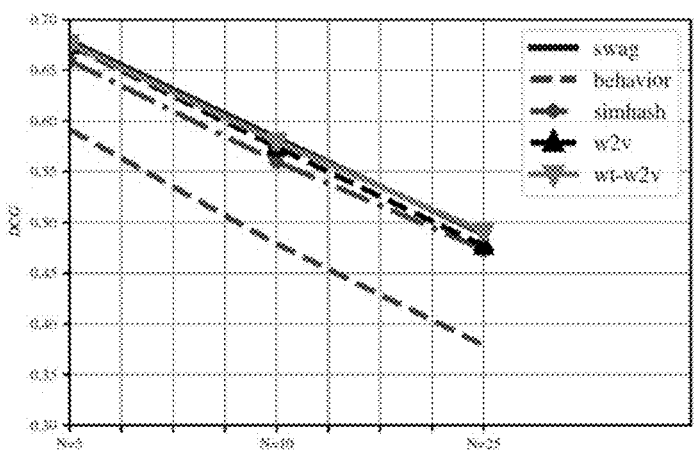
Figure 11C:
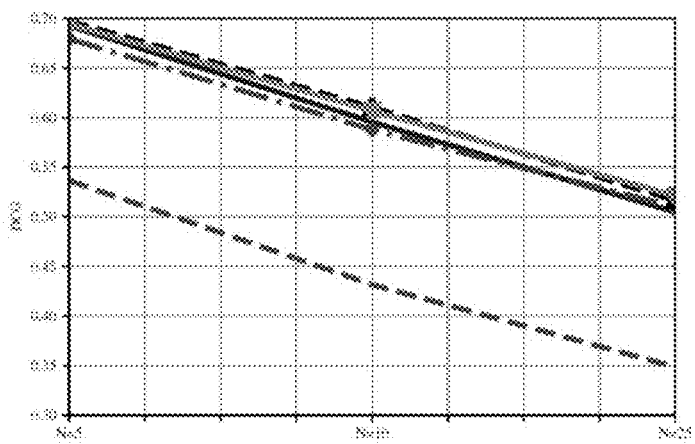

As seen in FIGS. 11A-11C, charts 1120, 1140, 1160 are shown, respectively, in which a Discounted Cumulative Gain (DCG) is calculated with all items being given equal relevance (=1). When there is a hit at rank i, we increase the gain by log(2) log(2+i).

From FIGS. 10A-10C and 11A-11C, the following observations can be made:

Store session-based behavioral algorithms leveraging item-item collaborative filtering fare poorly in all scenarios.

A weighted word2vec algorithm fares better than a naïve word2vec algorithm. However, the generation of weights required a lot of human feedback, which limits its scalability compared to others.

The SimHash performs exceptionally well for the three datasets. However, computing pairwise hamming distance is computationally more expensive than nearest neighbor for embeddings. It also requires human feedback, thus limiting its scalability.

SWAG(s) (based on substitution subgraphs) trained on store data performs poorly on the session-based dataset but outperforms SWAG(o) (trained using online customer transactions) on real substitution tasks in out-of-stock (OOS) and offline dataset.

SWAG(o) performs well for the session-based dataset since it considers similar data for training. The session-based dataset has false positives due to guest browse behavior; such behavior is well captured by SWAG(o) but not by SWAG(s).

SWAG(s) outperforms other algorithms for the OOS and offline datasets. It is able to efficiently boost the performance over both behavioral and attribute-based methods by combining the two in an unsupervised setting.

The performance difference between SWAG(o) and SWAG(s) across the three datasets demonstrates the difference in guest intent and guest behavior while shopping for groceries casually versus in a same-day scenario. This underlines the importance of utilizing the store assets for grocery delivery.

FIG. 11A-C shows that SWAG as well as w-w2v rank relevant recommendations slightly higher than others, and does significantly better than behavioral graph based recommendations.

Accordingly, and reviewing each of FIGS. 3-11, it is noted that use of behavioral data (e.g., item selection data, such as purchase history data) in combination with item description data in a model may improve overall selection results as compared to behavioral or item description-based methods alone. As described below, such systems may have particular applicability in the context of an assortment optimization system.

III. Assortment Optimization

Figure 12:
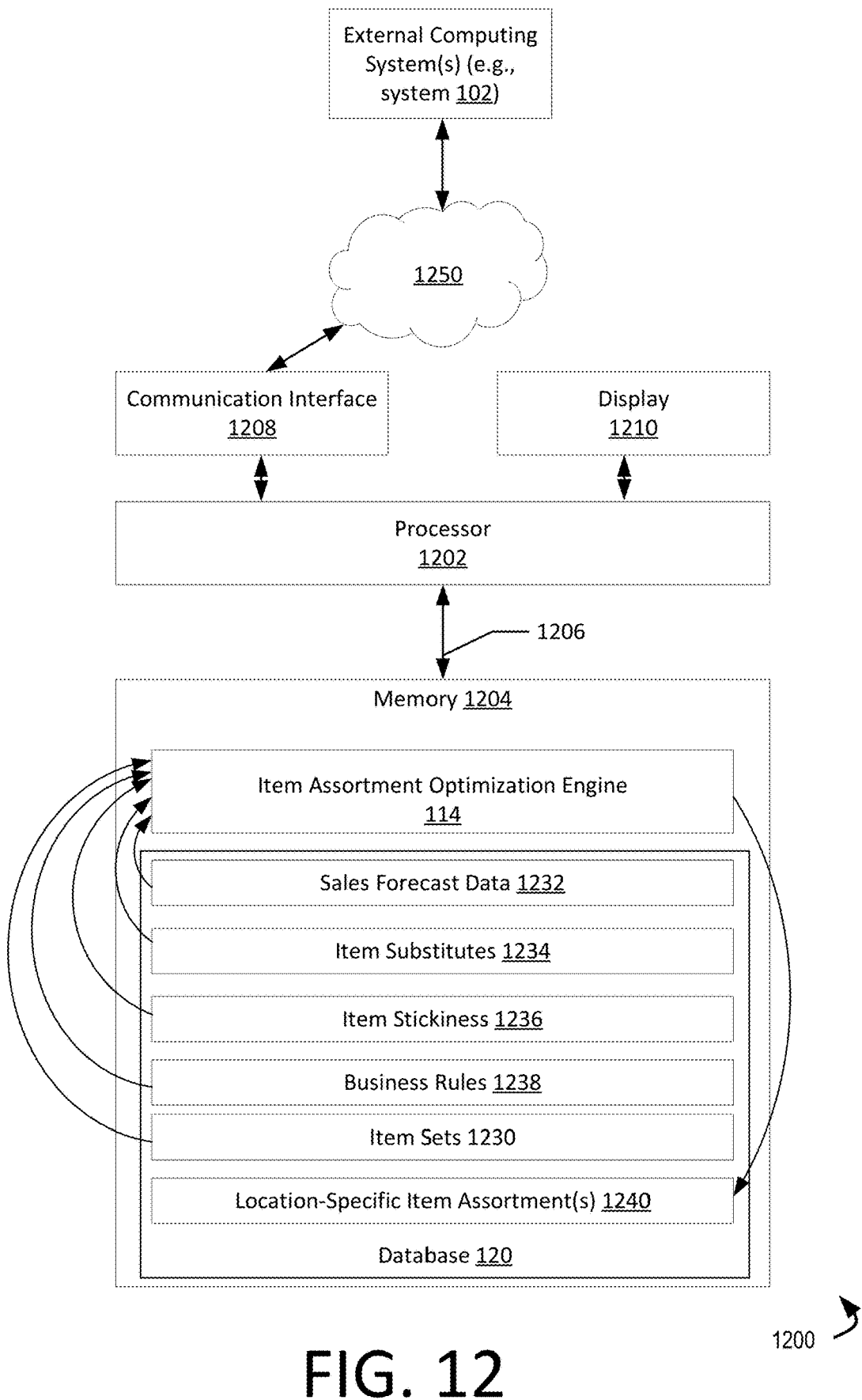
FIG. 12 illustrates a system for optimizing an assortment of items in a retail environment, according to an example embodiment.

Referring now to FIGS. 12-15, an assortment optimization system and method of its operation are described. In example embodiments, the assortment optimization system of the present disclosure applies an assortment optimization model aims to maximize the revenue from sales by selecting the right subset of items from the catalog to display on the store shelves. FIG. 12 illustrates the example assortment optimization engine 114, in a memory 1204 of a computing system 1200. The memory 1204 is communicatively coupled to a processor 1202 via a system bus 1206. The processor 1202 can, analogously to processor 302 of FIG. 3, execute computing instructions stored in the memory 1204 to perform tasks. A communication interface 1208 allows communication with external computing systems, such as user computing system 102 or other systems, via a network 1250, such as the internet.

In the example shown, the assortment optimization engine 114 generally includes an optimization model that generates assortment recommendation for a given category and a given store by taking the following inputs, shown as being retrieved from memory:

Item Sets 1230: Due to supply chain constraints, all items in the catalog are not available at all store locations. Every store has its own item set that is treated as its universal set and a subset of items is recommended by the assortment optimization model.

Sales forecast data 1232: The sales forecast of all the items in item set for the planning horizon.

Item stickiness data 1236: Item stickiness is a measure of customer loyalty that a particular item drives for the store. These items are not always the high selling items but they appear in most store trips made by certain customer cohorts. In order to prevent loss of customer goodwill, retailers often retain items in their assortment that drive high customer loyalty.

Business rule data 1238: Some products are deemed mandatory by law and a retailer has to carry those items in their assortment. Such items may be considered "locked in" items for the assortment. Another business rule is to keep a minimum number of items from self-owned brands that the retailer wants to showcase in the assortment. These business rules translate to constraints in the optimization model and give more control to the decision maker for planning the assortment.

Item substitution pairs 1234: When an item is absent from the inventory, guests may purchase alternate items instead of this particular item, and hence the demand is transferred to substitutes.

Based on this information the item assortment optimization engine 114 can generate location-specific item assortments given the various constraints defined by a user.

The item assortment optimization engine 114 is generally configured to apply an optimization model such that there are N unique items that a given store shelf can carry and $x_i$ denotes whether the item i is selected in the assortment. $w_{ij}$ is the edge weight between items i and j in a substitution item network for a particular category. Further, $p_{ij}$ represents the proportion of customers who could substitute item i with item j if item i is out of stock, and $s_i$ represents forecasted sales volume for item i in the projected timeframe for which assortment planning is executed. Using $S_{LockedIn}$, and $S_{LockedOut}$ to represent locked-in and locked-out items according to business rules, the assortment optimization model can be constructed as:

$$\max_i = \sum_{i=1}^{N} x_i s_i + \sum_{i=1}^{N} \sum_{j=1}^{N} s_i p_{ij} x_j (1 - x_i)$$

Subject to the constraints:

$$\sum_{i=1}^{N} x_i \leq \text{MaxItemCount}$$

$$\sum_{i=1}^{N} x_i \geq \text{MinItemCount}$$

$$x_i \geq \text{loyalty}_i - \text{loyalty}_{threshold}$$

In the above context, the primary equation represents the objective function for maximizing revenue. The maximum and minimum item counts are defined by business rules, and the final constraint ensures that if an item exceeds the threshold on the loyalty/stickiness metric then it is included in the assortment. Similarly, all other business rules can also be added as constraints in the optimization problem.

Figure 13:
FIG. 13 is a schematic illustration of an example assortment that may be generated using the assortment optimization techniques described herein.

FIG. 13 is a schematic diagram illustrating creation of an optimized assortment including one or more constraints. Here the assortment optimization engine 114 is applying the constraints to the initial item assortment 1302 to arrive at an optimized item assortment 1310. In this context, the initial item assortment 1302 may correspond to an overall item assortment available within a retail enterprise, and the optimized item assortment 1310 represents an item assortment for the particular location; as such, the optimized item assortment 1310 will generally represent a subset of the initial item assortment 1302. Additionally, the optimized item assortment 1310 will follow the constraints set in the assortment optimization algorithm to ensure inclusion or exclusion of specific items (e.g., prohibited items locked out, and store brand items locked in), limit a number of items in the item collection, or provide other constraints.

The above assortment optimization process was performed on data continuing from the above example, e.g., using two categories from the grocery division, cookies and crackers, to describe the model results and the store tests that were conducted. An optimized assortment is seen in the chart 1400 of FIG. 14. Example result sets from store tests that were performed across a sampling of stores in four different metropolitan areas can be seen in the chart 1500 of FIG. 15.

Figure 14:
FIG. 14 is a chart illustrating an example optimized assortment used in comparison testing of the assortment optimization approach described herein.
Figure 15:
FIG. 15 is a chart illustrating example test results in comparison testing of the assortment optimization approach described herein relative to an existing assortment.

As seen in chart 1400 of FIG. 14, a cookie category was rank-ordered by sales volume. The assortment optimization algorithm described above was used in conjunction with a behavioral model (due to robust data being available) to generate an optimized assortment. In this example, although over 2,000 cookie variants are on offer, only 408 were available for stocking due to supply chain constraints, and the store locations each only had room for 186 cookie variants. An optimized assortment includes, as seen in chart 1400, a large number of high selling items, but drops a few fair sellers in favor of lower selling cookies due to substitutability and/or demand transfer of other items for some of the fair-selling items. That said, only 8 items from low sales ranked item were dropped and replaced by 8 other items which were ranked even lower in forecasted sales but could potentially absorb the demand from all other items that were not being selected in the assortment. The forecasted sales are generated from models that do not capture the interactions of demand across items that are on display for sale at the same time. Hence, when the projected sales forecast are large in value, they overshadow the impact of substitutability.

As seen in the chart 1500, experiments were designed across four different markets, namely, Atlanta, Chicago, Houston and Washington D.C. In total 120 stores were selected for control and test group across 4 markets with each group containing 15 stores.

Units sold and number of transactions made were primary metrics chosen for this experiment. At a 95% confidence interval, it was seen that substitutability and assortment optimization had a positive impact in two of four markets, and at least a flat to slight improvement in the remaining two markets. Overall, a sales lift in excess of 11% was seen for both units sold and number of transactions. Accordingly, an assortment optimization based on more than solely sales volume of the given product may result in overall improved sales due to accommodations for demand transfer and substitutability. By using one or more item substitutability models to extend the substitutability information across otherwise-sparse data, this sales lift can be extended across a retail enterprise's physical store locations.

Additional details regarding the above analysis, and modeling overall, can be found in the following publication, the disclosure of which is incorporated by reference in its entirety: Pande et al., *Substitution Techniques for Grocery Fulfillment and Assortment Optimization Using Product Graphs*, MLG '20, Aug. 22-27, 2020, San Diego, CA.

IV. User Interfaces for Assortment Optimization and Product Fulfillment

Figure 16:
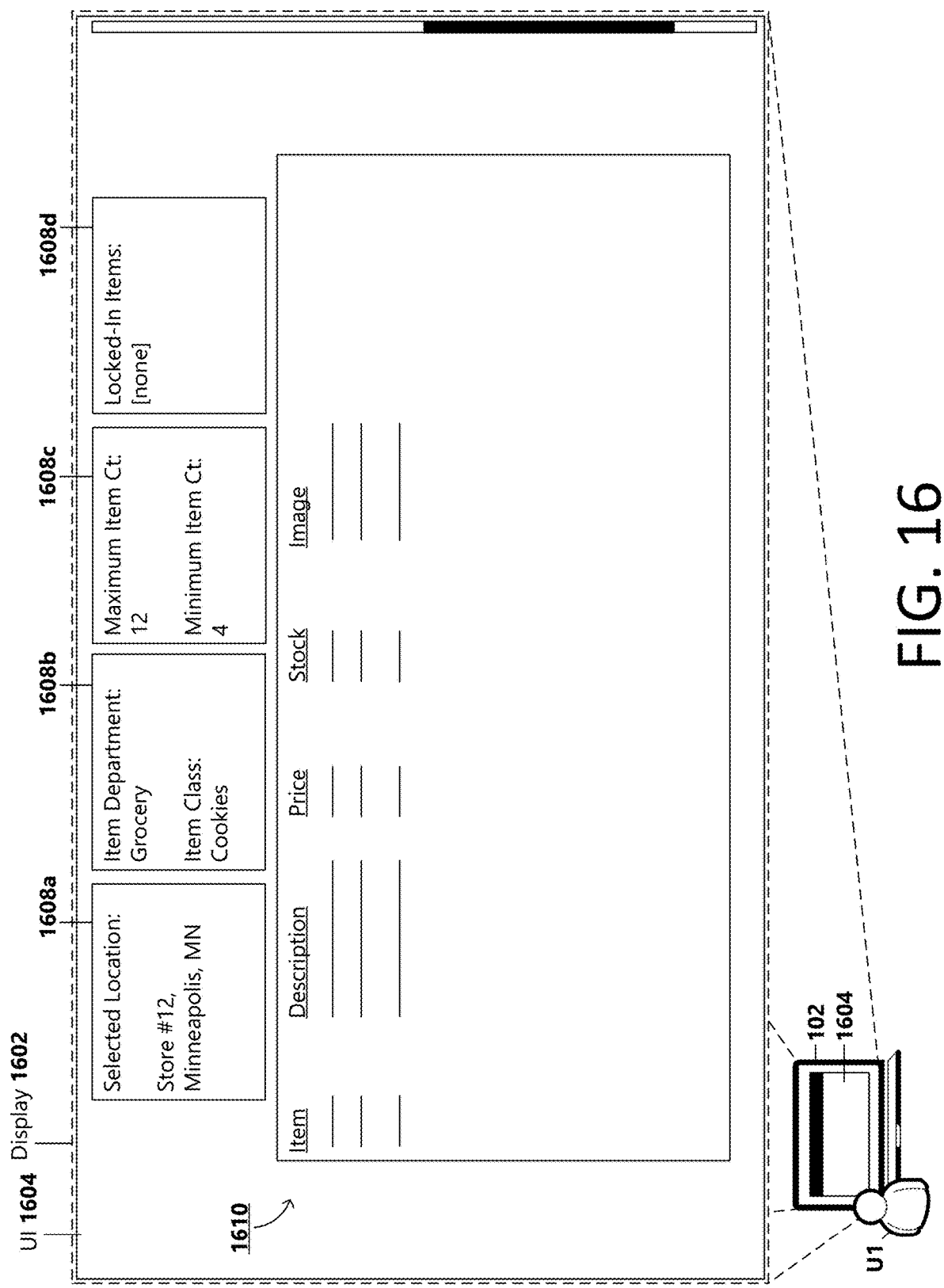
FIG. 16 illustrates a user interface for submitting a request for an optimized assortment for a particular location and receiving an assortment optimization recommendation, according to an example embodiment.

Referring now to FIGS. 16-17, example user interfaces useable with the substitutability and assortment optimization systems described herein are depicted. FIG. 16 specifically illustrates an example user interface for defining and receiving an optimized item assortment. FIG. 17 illustrates an example user interface for recommending substitute items, for example when a particular item is not offered at a particular retail location, or may be out of stock.

Referring first to FIG. 16, a user interface 1604 may be presented on a display 1602 of a computing device, such as computing device 102 described above with respect to FIG. 1. A user U1 of the computing device 102 may use the user interface to define constraints and request an optimized assortment, according to the methods described previously.

In the example shown, the user interface 1604 includes a plurality of definition regions 1608a-d which allow a user to define parameters associated with a particular assortment. For example, a first definition region 1608a allows a user to define a particular location to which the assortment may be applied. A second definition region 1608b may allow the user to define an entire store, department, subdepartment, or even category at which an item assortment is to be defined. As illustrated, the "cookies" item category is selected from among all grocery items. Additionally, a constraints definition region 1608c allows the user to define a minimum and maximum number of items in the category to be stocked. A further constraints definition region 1608d allows the user to define any locked-in (e.g., house brand) or locked out items for the particular optimized assortment. Additional constraints may be applied as well, such as thresholds for item stickiness and/or substitutability.

In the example shown, an item assortment region 1610 displays an optimized item assortment for use. The optimized item assortment may be displayed, for example, after a request including the defined constraints is sent to the assortment optimization engine 114, and an optimized assortment is returned. The user U1 may then take action to, e.g., export the item assortment or otherwise communicate the optimized item assortment for application at the selected retail location.

FIG. 17 illustrates a second possible user interface 1704 presented on a display 1702 of a user device, such as mobile device 180 (e.g., a laptop or mobile device, such as a tablet or mobile phone). The user interface 1704 includes a variety of selectable items, and indicates items eligible for same-day delivery to a particular zip code (in this case, 55402) from within a grocery category. A selection of previously-purchased items by the user U2 is presented to improve user convenience in repurchasing the same or similar items. In this example, previously purchased items 1710*a-c* are presented.

In the example shown, a user may select an interactive element on the user interface 1704, such as a "shop similar items" button proximate to one of the previously-purchased items (e.g., as the cursor is shown relative to item 1710*a*). In this instance, a separate user interface region 1712 can present to the user a set of substitutable items that are available and in stock at the currently-selected retail location, e.g., eligible for pick up or same-day delivery. In this example, three such items are presented, but more or fewer substitutable items might be presented, depending on the number of substitutable products identified based on the modeling described above in conjunction with FIGS. 3-11.

The user interface 1704 of FIG. 17 is particularly useful in the context of use of a retail location as a hub for shipping goods to customers, or allowing customers to pick up orders at stores. Fulfillment via stores is significantly cost-efficient than via the fulfillment centers. Making stores the hub for fulfillment implies challenges for planning assortment for the customers as well as handling the scenarios when a customer is looking for an out-of-stock (OOS) product. For same-day fulfillment via stores in the form of store-pickup or drive-up or home delivery, the inventory is transient. For example, while a user U2 may be placing an order for mangoes, another customer might have bought the entire crate of mangoes from the stores and it is not ticketed yet. Or a reportedly fresh product might be found to be stale when a same-day delivery shopper goes to pick it up. Because overall inventory level in stores is lower than fulfillment centers, these scenarios occur more often in such store locations. In all these scenarios, accurately recommending substitutable products to the customers, such as in the user interface 1700, is particularly advantageous.

V. Example Computing Environment

Figure 18:
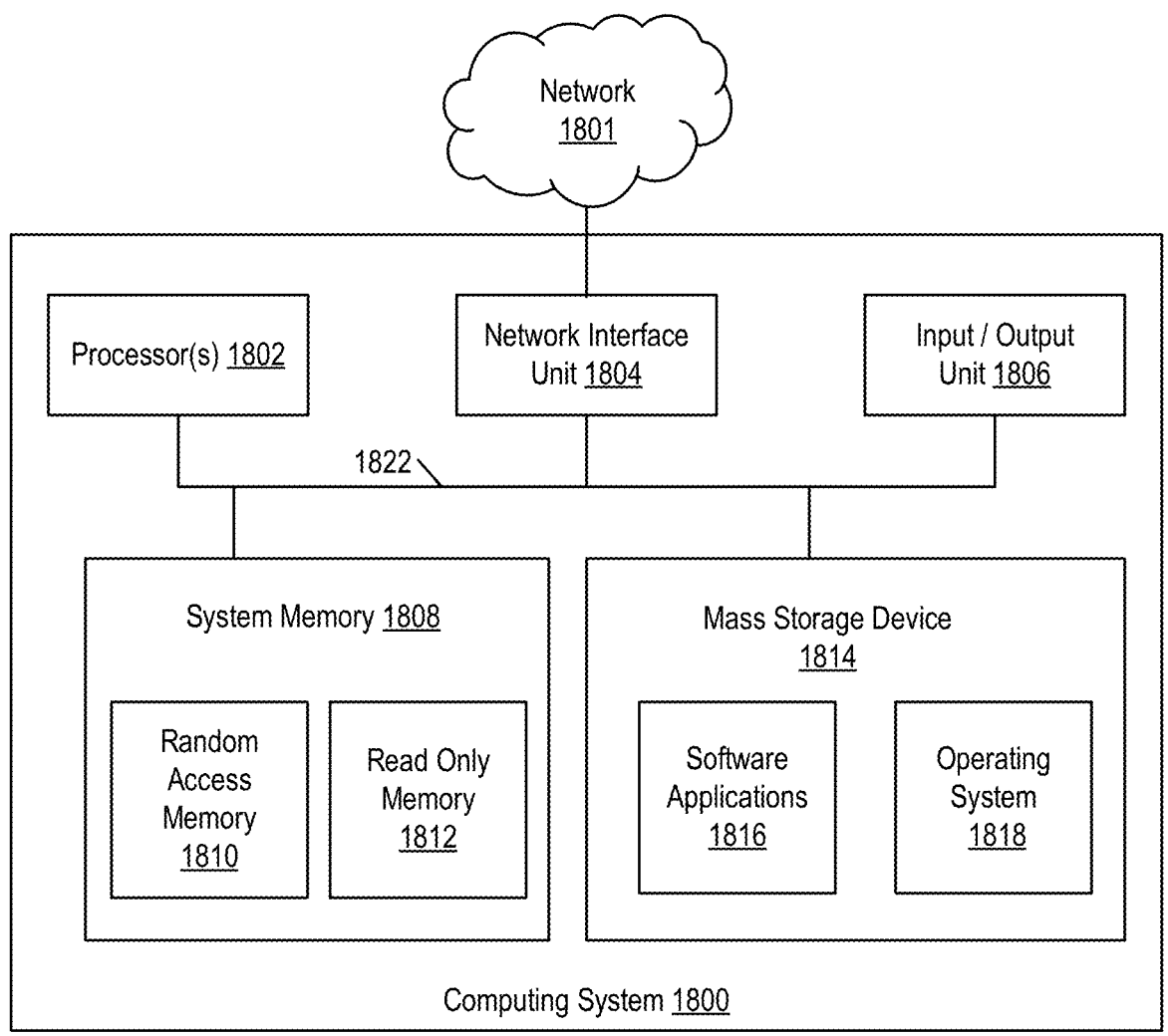
FIG. 18 illustrates an example computing system with which aspects of the present disclosure may be implemented.

FIG. 18 illustrates an example block diagram of a virtual or physical computing system 1800. One or more aspects of the computing system 1800 can be used to implement the processes described herein, for example implementing one or more of the computing systems 102, 112, 116, 170, 180, 190, 300, 1200 previously mentioned.

In the embodiment shown, the computing system 1800 includes one or more processors 1802, a system memory 1808, and a system bus 1822 that couples the system memory 1808 to the one or more processors 1802. The system memory 1808 includes RAM (Random Access Memory) 1810 and ROM (Read-Only Memory) 1812. A basic input/output system that contains the basic routines that help to transfer information between elements within the computing system 1800, such as during startup, is stored in the ROM 1812. The computing system 1800 further includes a mass storage device 1814. The mass storage device 1814 is able to store software instructions and data. The one or more processors 1802 can be one or more central processing units or other processors.

The mass storage device 1814 is connected to the one or more processors 1802 through a mass storage controller (not shown) connected to the system bus 1822. The mass storage device 1814 and its associated computer-readable data storage media provide non-volatile, non-transitory storage for the computing system 1800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1800.

According to various embodiments of the invention, the computing system 1800 may operate in a networked environment using logical connections to remote network devices through the network 1801. The network 1801 is a computer network, such as an enterprise intranet and/or the Internet. The network 1801 can include a LAN, a Wide Area Network (WAN), the Internet, wireless transmission mediums, wired transmission mediums, other networks, and combinations thereof. The computing system 1800 may connect to the network 1801 through a network interface unit 1804 connected to the system bus 1822. It should be appreciated that the network interface unit 1804 may also be utilized to connect to other types of networks and remote computing systems. The computing system 1800 also includes an input/output controller 1806 for receiving and processing input from a number of other devices, including a touch user interface display screen, or another type of input device. Similarly, the input/output controller 1806 may provide output to a touch user interface display screen or other type of output device.

As mentioned briefly above, the mass storage device 1814 and the RAM 1810 of the computing system 1800 can store software instructions and data. The software instructions include an operating system 1818 suitable for controlling the operation of the computing system 1800. The mass storage device 1814 and/or the RAM 1810 also store software instructions, that when executed by the one or more processors 1802, cause one or more of the systems, devices, or components described herein to provide functionality described herein. For example, the mass storage device 1814 and/or the RAM 1810 can store software instructions that, when executed by the one or more processors 1802, cause the computing system 1800 to receive and execute managing network access control and build system processes.

Referring to FIGS. 1-18 generally, the disclosed environment provides a physical environment with which aspects of the item assortment optimization and product fulfillment decisionmaking systems can be implemented. Generally, item attribute data and customer purchase data can be used to generate networks of substitutable items. The substitutable item networks can be integrated with an assortment optimization engine to select an optimal assortment of products for stores, or in an online environment. Additionally, various substitution techniques may be applied when a particular item within an item assortment is determined to be out of stock. For example, use of such substitutable item networks can be used to recommend alternative items for purchase by customers in an online environment. In both instances, the combination of the item substitutability analyses described herein with the assortment optimization techniques provided allow for improvements in selecting appropriate item assortments at particular retail locations, and providing recommendations for substitute items when items are unavailable at a particular retail location (e.g., due to being out of stock or not within the assortment carried by that retail location).

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An item assortment management system comprising:
a computing system comprising one or more processors communicatively coupled to a memory subsystem that stores instructions which, when executed, cause the one or more processors to:
obtain transactional data regarding an overall item assortment of a retail enterprise from the transactional data including transactions across the retail enterprise;
obtaining an initial item assortment and a set of constraints from a user computing device;
for items within an item category, training a model comprising a graph convolutional network suitable for weighted graphs to learn embeddings for nodes representing potentially substitutable items, the model generating a graph having edge weights corresponding to a degree of substitutability between items and being based at least in part on the transaction data and item data describing items in the item assortment;
identify one or more item substitution pairs within the item category based on the degree of substitutability being greater than a threshold;
obtain location specific item assortment parameters for an item category at an identified retail location within the retail enterprise, the retail enterprise including a plurality of retail locations, the location specific item assortment parameters including mandatory items that must be stocked within a given item category, and a minimum number of items that should be stocked for the given item category; and
generate an optimized item assortment for a retail location of the retailer, the retail location being sized to stock the optimized item assortment including fewer than all of the items in the overall item assortment, wherein the optimized item assortment is based at least in part on a set of items within the item category available at the identified retail location, a sales forecast for items in the set of items, a customer loyalty factor, the one or more item substitution pairs, and one or more physical constraints specific to the retail location;
receive a request for an item in the initial item assortment from the user computing device that is excluded from the optimized item assortment, the request being for a same-day purchase of the item from the retail location;
present, in a user interface of the user computing device, a display of a recommendation of an item within the optimized item assortment that is in stock at the retail location including at least one item excluded from the optimized item assortment, the recommendation of the item received from the graph convolutional network, by automatically displaying an element in the user interface proximate to the display of the at least one item; and
in response to selection of the user interface element, displaying in a separate region of the user interface one or more items from among the assortment recommendation determined to be substitutable for the at least one item.

2. The item assortment management system of claim 1, wherein the item data includes item purchase data derived from online purchase transactions.

3. The item assortment management system of claim 1, wherein the computing system applies item-to-item collaborative filtering to identify substitutable item pairs.

4. The item assortment management system of claim 1, wherein the graph convolutional network is trained based at least in part on online guest transactions.

5. The item assortment management system of claim 4, wherein the graph convolutional network is trained based at least in part on substitution subgraphs generated from portions of the item assortment.

6. The item assortment management system of claim 1, wherein the optimized item assortment is further based in part on one or more business rules including a rule defining items within the item category indicated as being mandatory to be stocked at the identified retail location.

7. The item assortment management system of claim 1, wherein the optimized item assortment maximizes sales volume of items across the item category subject to a business requirement of an item having an item loyalty greater than a predetermined threshold.

8. The item assortment management system of claim 7, wherein the optimized item assortment includes at least one substitute item from a substitutable item pair in place of another item within the substitutable item pair based at least in part on one or more of the constraints.

9. The item assortment management system of claim 7, wherein the optimized item assortment is determined according to:

$$\max_i = \sum_{i=1}^{N} x_i s_i + \sum_{i=1}^{N} \sum_{j=1}^{N} s_i p_{ij} x_j (1 - x_i)$$

wherein i is the item at issue in an item category, from among items 1 to N, x is a binary indicating whether an item is included in an assortment, s is a forecasted sales volume, j represents a substitute of item i, and p represents a proportion of customers who would substitute item i for item j, subject to constraints:

$$\sum_{i=1}^{N} x_i \leq \text{MaxItemCount}$$

$$\sum_{i=1}^{N} x_i \geq \text{MinItemCount}$$

$$x_i \geq \text{loyalty}_i - \text{loyalty}_{threshold}.$$

10. The item assortment management system of claim 1, wherein the request for the item comprises a request for same-day delivery of the item from the identified retail location.

11. The item assortment management system of claim 1, wherein the transactional data comprises user purchase data associated with the overall item assortment.

12. The item assortment management system of claim 1, wherein the optimized item assortment includes fewer than all items from the overall item assortment.

13. The item assortment management system of claim 1, wherein the optimized item assortment maximizes sales of items across the item category subject to a business requirement of an item having an item loyalty greater than a predetermined threshold.

* * * * *